United States Patent
Park et al.

(10) Patent No.: US 10,166,718 B2
(45) Date of Patent: Jan. 1, 2019

(54) APPARATUS FOR FABRICATING THREE-DIMENSIONAL OBJECT

(71) Applicants: Soyoung Park, Kanagawa (JP); Yasukazu Ono, Kanagawa (JP)

(72) Inventors: Soyoung Park, Kanagawa (JP); Yasukazu Ono, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 199 days.

(21) Appl. No.: 15/173,853

(22) Filed: Jun. 6, 2016

(65) Prior Publication Data

US 2016/0361874 A1 Dec. 15, 2016

(30) Foreign Application Priority Data

Jun. 12, 2015 (JP) .................. 2015-119524
Oct. 20, 2015 (JP) .................. 2015-206322

(51) Int. Cl.
*B29C 64/357* (2017.01)
*B33Y 40/00* (2015.01)
(Continued)

(52) U.S. Cl.
CPC ........ *B29C 64/357* (2017.08); *B29B 17/0404* (2013.01); *B29C 64/141* (2017.08);
(Continued)

(58) Field of Classification Search
None
See application file for complete search history.

(56) References Cited

U.S. PATENT DOCUMENTS 8,827,681 B2* 9/2014 Chen .................. B08B 5/02
264/113
2001/0045678 A1 11/2001 Kubo et al.
(Continued)

FOREIGN PATENT DOCUMENTS

DE 102012014838 A1 1/2014
JP 8-281808 10/1996
(Continued)

OTHER PUBLICATIONS

European search report dated Feb. 20, 2017 in connection with corresponding European patent application No. 16173582.4.
(Continued)

*Primary Examiner* — Jacob T Minskey
*Assistant Examiner* — Baileigh Kate Darnell
(74) *Attorney, Agent, or Firm* — Cooper & Dunham LLP

(57) ABSTRACT

A three-dimensional fabrication apparatus includes a fabrication chamber, a supply chamber, a flattening unit, and a powder collector. The powder collector is disposed forward from the flattening unit in a transfer direction of the flattening unit. The powder collector is movable with movement of the flattening unit. The powder collector includes a body container, a collection port, and a discharge port. When the flattening unit transfers and supplies powder, the powder collector collects a portion of the powder from the collection port and contains the portion of the powder in the body container. When the flattening unit returns to the supply chamber, the powder collector discharges and supplies the powder from the body container to the supply chamber through the discharge port.

7 Claims, 30 Drawing Sheets

(51) Int. Cl.
*B29C 64/35* (2017.01)
*B29C 64/386* (2017.01)
*B29C 64/165* (2017.01)
*B29C 64/141* (2017.01)
*B29B 17/04* (2006.01)
*B33Y 30/00* (2015.01)
*B33Y 50/02* (2015.01)
*B29K 105/16* (2006.01)
*B29K 505/00* (2006.01)
*B29K 509/02* (2006.01)

(52) U.S. Cl.
CPC ............ *B29C 64/165* (2017.08); *B29C 64/35* (2017.08); *B29C 64/386* (2017.08); *B29K 2105/16* (2013.01); *B29K 2505/00* (2013.01); *B29K 2509/02* (2013.01); *B33Y 30/00* (2014.12); *B33Y 40/00* (2014.12); *B33Y 50/02* (2014.12); *Y02W 30/625* (2015.05)

(56) References Cited

U.S. PATENT DOCUMENTS

| | | | |
|---|---|---|---|
| 2002/0041818 A1 | 4/2002 | Abe et al. | |
| 2004/0084814 A1* | 5/2004 | Boyd | B29C 64/153 264/497 |
| 2004/0173945 A1* | 9/2004 | Khoshnevis | B33Y 30/00 264/497 |
| 2008/0006334 A1* | 1/2008 | Davidson | B33Y 30/00 137/571 |
| 2008/0211132 A1* | 9/2008 | Feenstra | B22F 3/1055 264/113 |
| 2010/0006228 A1* | 1/2010 | Abe | B33Y 30/00 156/356 |
| 2010/0247703 A1* | 9/2010 | Shi | B29C 64/165 425/375 |
| 2010/0247742 A1* | 9/2010 | Shi | C23C 24/04 427/8 |
| 2015/0298397 A1* | 10/2015 | Chen | B07B 4/00 209/12.2 |
| 2015/0343533 A1 | 12/2015 | Park et al. | |
| 2015/0367417 A1* | 12/2015 | Buller | B23K 26/346 419/53 |
| 2016/0067929 A1 | 3/2016 | Park | |
| 2016/0271887 A1* | 9/2016 | Shi | B29C 67/0096 |
| 2017/0050386 A1* | 2/2017 | Houben | B33Y 10/00 |

FOREIGN PATENT DOCUMENTS

| | | |
|---|---|---|
| JP | 2001-009921 | 1/2001 |
| JP | 2003-231183 | 8/2003 |
| JP | 2005-335199 | 12/2005 |
| JP | 2013-067119 | 4/2013 |

OTHER PUBLICATIONS

European search report dated Nov. 18, 2016 in corresponding European Patent Application No. 16173582.4.

* cited by examiner

APPARATUS FOR FABRICATING THREE-DIMENSIONAL OBJECT

CROSS-REFERENCE TO RELATED APPLICATIONS

This patent application is based on and claims priority pursuant to 35 U.S.C. § 119(a) to Japanese Patent Application Nos. 2015-119524, filed on Jun. 12, 2015, and 2015-206322, filed on Oct. 20, 2015, in the Japan Patent Office, the entire disclosure of each of which is hereby incorporated by reference herein.

BACKGROUND

Technical Field

Aspects of the present disclosure relate to an apparatus for fabricating a three-dimensional object.

Related Art

A solid (three-dimensional) fabricating apparatus uses, for example, a lamination fabrication method to fabricate a solid (three-dimensional) object. In this method, for example, a flattened metal or non-metal powder is formed in a shape of layer on a fabrication stage, and fabrication liquid is discharged from a head to a layered powder (referred to as "powder layer") on the fabrication stage to form a layered fabrication object (referred to as "fabrication layer") in which powder particles are bonded together. A step of forming another powder layer on the fabrication layer to reform the fabrication layer is repeated to laminate the fabrication layers one on another, thus fabricating a three-dimensional object.

SUMMARY

In an aspect of this disclosure, there is provided a three-dimensional fabrication apparatus that includes a fabrication chamber, a supply chamber, a flattening unit, and a powder collector. In the fabrication chamber, powder is layered to form a powder layer, the powder of the powder layer is bonded together to form a layered fabrication object, and another layered fabrication object is laminated on the layered fabrication object. The supply chamber retains the powder to be supplied to the fabrication chamber. The flattening unit flattens the powder while transferring and supplying the powder from the supply chamber to the fabrication chamber. The powder collector is disposed forward from the flattening unit in a transfer direction of the flattening unit in which the flattening unit transfers the powder. The powder collector is movable with movement of the flattening unit. The powder collector collects a portion of the powder transferred and supplied with the flattening unit. The powder collector includes a body container, a collection port, and a discharge port. The body container contains the powder inside. The collection port introduces the powder to the body container. The discharge port discharges the powder contained in the body container. When the flattening unit transfers and supplies the powder, the powder collector collects the portion of the powder from the collection port and contains the portion of the powder in the body container. When the flattening unit returns to the supply chamber, the powder collector discharges and supplies the powder from the body container to the supply chamber through the discharge port.

In another aspect of this disclosure, there is provided a three-dimensional fabrication apparatus that includes a fabrication chamber, a first collection recycling device, and a second collection recycling device. In the fabrication chamber, powder is layered to form a powder layer, the powder of the powder layer is bonded together to form a layered fabrication object, and another layered fabrication object is laminated on the layered fabrication object. The first collection recycling device performs a first processing of collecting the powder discharged outside the fabrication chamber and restoring the collected powder to a usable state. The second collection recycling device performs a second processing of collecting the powder in the fabrication chamber and restoring the collected powder to a usable state. The second processing performed by the second collection recycling device at least partially differs from the first processing performed by the first collection recycling device.

In still another aspect of this disclosure, there is provided a three-dimensional fabrication apparatus that includes a fabrication chamber, a supply chamber, a flattening unit, a cover, and a suction unit. In the fabrication chamber, powder is layered to form a powder layer, the powder of the powder layer is bonded together to form a layered fabrication object, and another layered fabrication object is laminated on the layered fabrication object. The supply chamber retains the powder to be supplied to the fabrication chamber. The flattening unit flattens the powder while transferring and supplying the powder from the supply chamber to the fabrication chamber. The cover is disposed opposite a portion of a periphery of the flattening unit. The suction unit sucks an inside of the cover.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
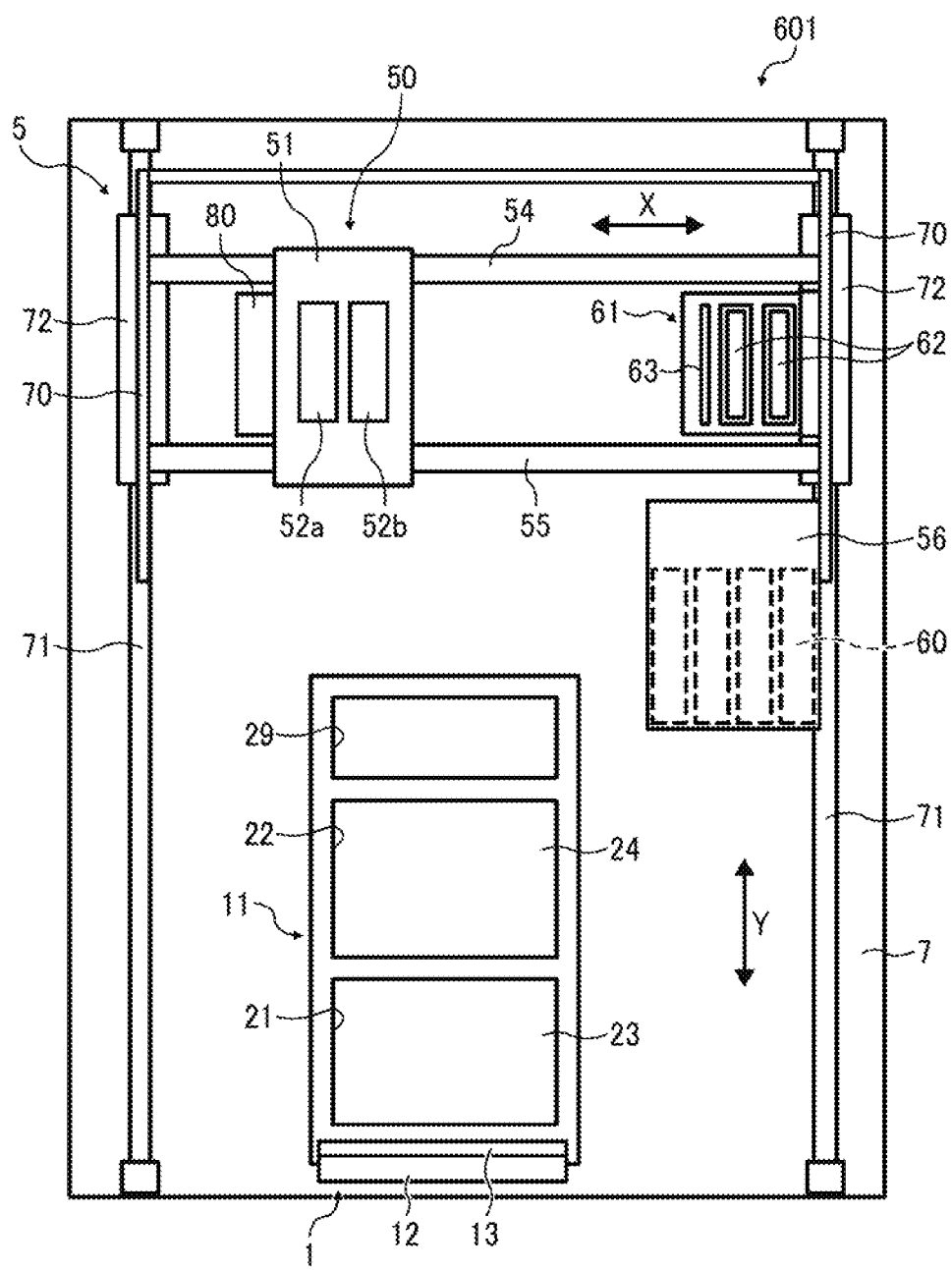
FIG. 1 is a schematic plan view of an example of a the three-dimensional fabricating apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Figure 2:
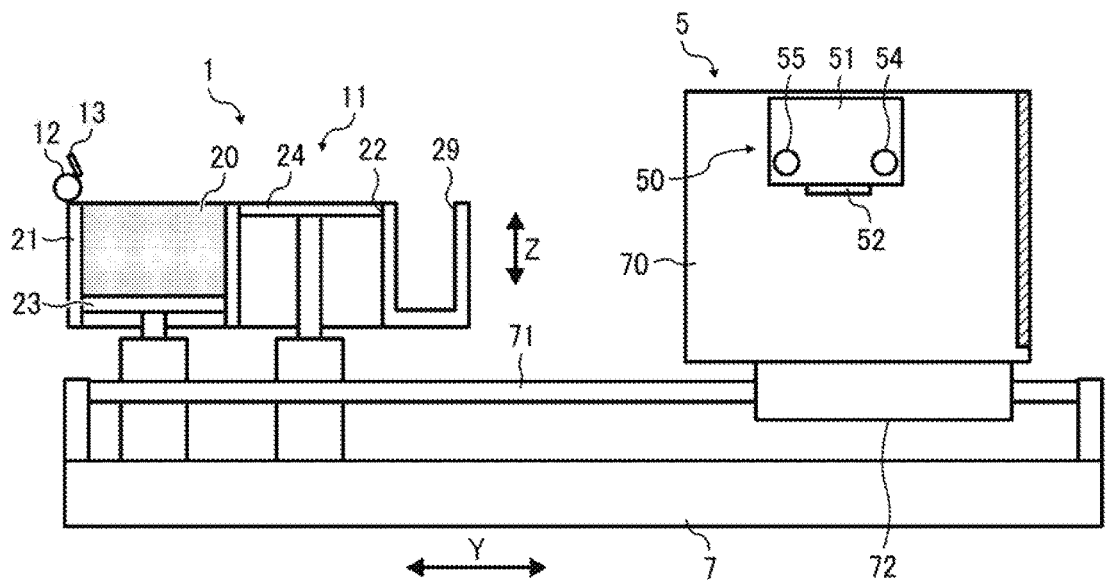
FIG. 2 is a side view of the three-dimensional fabricating apparatus of FIG. 1.
Figure 3:
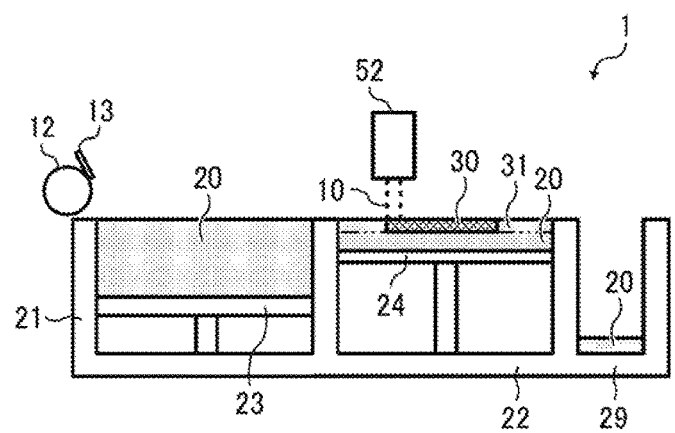
FIG. 3 is a cross-sectional view of a fabrication section of the three-dimensional fabricating apparatus.
Figure 4:
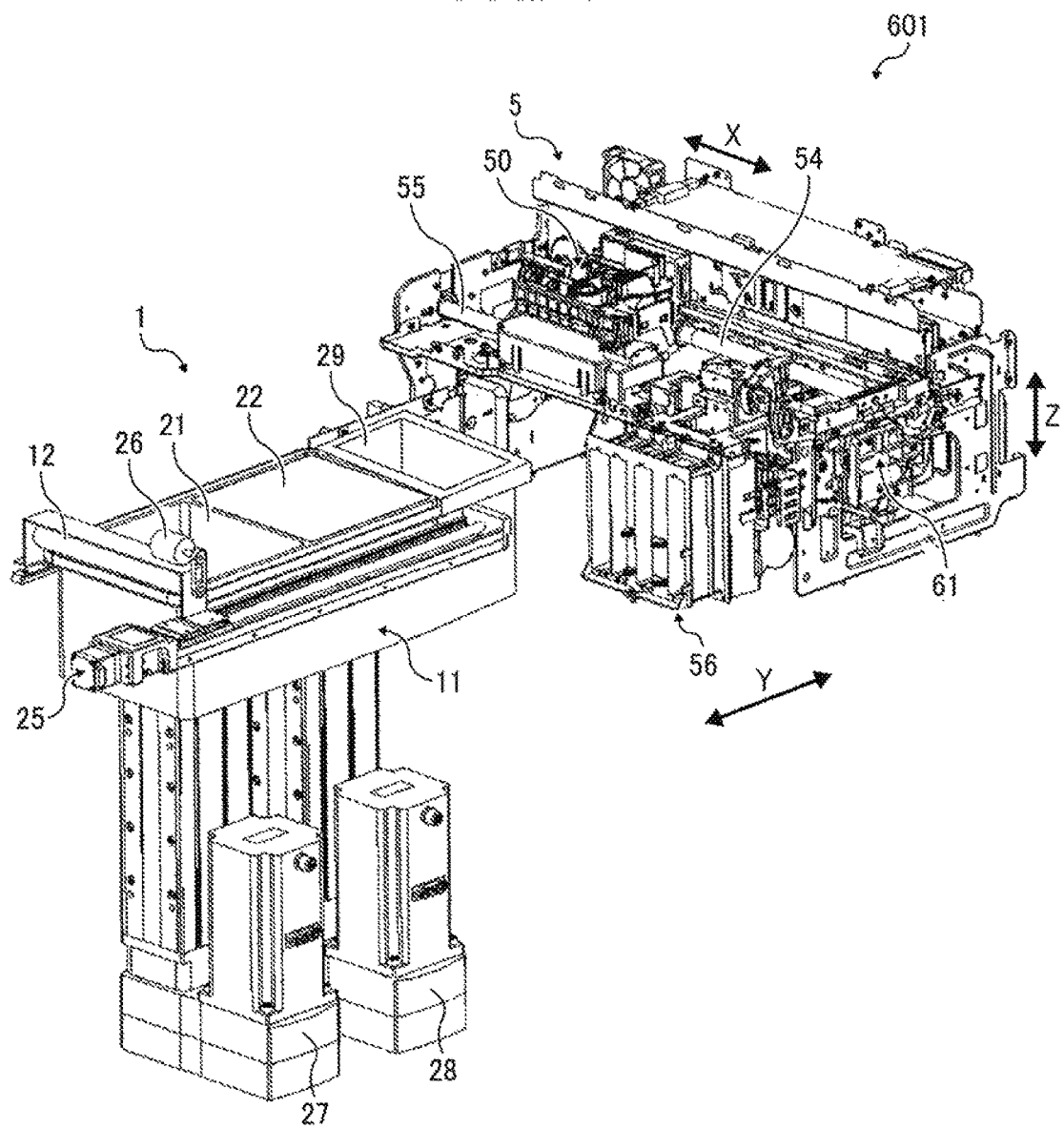
FIG. 4 is a perspective view of a portion of the fabrication section.

Referring now to the drawings, wherein like reference numerals designate identical or corresponding parts throughout the several views, exemplary embodiments of the present disclosure are described below. First, a three-dimensional fabricating apparatus according to an embodiment of this disclosure is described with reference to FIGS. 1 through 4. FIG. 1 is a plan view of the three-dimensional fabricating apparatus according to an embodiment of this disclosure. FIG. 2 is a side view of a fabrication section of the three-dimensional fabricating apparatus of FIG. 1. FIG. 3 is a cross-sectional view of the fabrication section of FIG. 2. FIG. 4 is a perspective view of a portion of the three-dimensional fabricating apparatus of FIG. 1. In FIG. 3, a state of the fabricating section during fabrication is illustrated.

In this embodiment, a three-dimensional fabricating apparatus 601 is a powder fabricating apparatus (also referred to as a powder fabricating apparatus). The three-dimensional fabricating apparatus 601 includes a fabrication section 1 and a fabrication unit 5. The fabrication section 1 forms a fabrication layer 30 that is a layered fabrication object in which powders are bonded together. The fabrication unit 5 fabricates a three-dimensional object by discharging fabrication liquid 10 onto a powder layer 31 that is overlaid in layers in the fabrication section 1.

The fabrication section 1 includes a powder chamber 11 and a flattening roller 12 as a rotary body that is a flattening unit (recoater). Note that the flattening unit may be, for example, a plate member (blade) instead of the rotary body.

The powder chamber 11 includes a supply chamber 21, a fabrication chamber 22, and a surplus powder receiver 29. The supply chamber 21 retains the powder 20 to be supplied to the fabrication chamber 22. In the fabrication chamber 22, fabrication layers 30 are laminated one on another to fabricate an object. The surplus powder receiver 29 stores a surplus of the powder 20, which falls without forming the powder layer 31, of the powder 20 transferred and supplied by the flattening roller 12 to form the powder layer 31.

A bottom portion of the supply chamber 21 serves as a supply stage 23 and is movable upward and downward in a vertical direction (height direction). Similarly, a bottom portion of the fabrication chamber 22 serves as a fabrication stage 24 and is movable upward and downward in the vertical direction (height direction). A three-dimensional object in which the fabrication layers 30 are laminated is fabricated on the fabrication stage 24. For example, a suction unit to suck the powder 20 is disposed on a bottom face of the surplus powder receiver 29 and the surplus powder receiver 29 is simply removable.

For example, as illustrated in FIG. 4, a motor 27 moves the supply stage 23 upward and downward along a direction indicated by arrow Z. Likewise, a motor 28 moves the fabrication stage 24 upward and downward along a direction indicated by arrow Z.

The flattening roller 12 transfers and supplies the powder 20, which has been supplied on the supply stage 23 of the supply chamber 21, to the fabrication chamber 22 and evens and flattens the surface of a layer of the powder 20, which has been supplied with the flattening roller 12 as the flattening unit, to form the powder layer 31.

The flattening roller 12 is disposed to be relatively reciprocally movable with respect to a stage surface (a surface on which powder 20 is stacked) of the fabrication stage 24 along a direction indicated by arrow Y in FIG. 2, which is a direction along the stage surface of the fabrication stage 24. The flattening roller 12 is moved by a reciprocal moving assembly 25. The flattening roller 12 is driven to rotate by a motor 26.

The fabrication unit 5 includes a liquid discharge unit 50 to discharge fabrication liquid 10 to the powder layer 31 on the fabrication stage 24.

The liquid discharge unit 50 includes a carriage 51 and two liquid discharge heads (hereinafter referred to as simply "head(s)") 52a and 52b mounted on the carriage 51. In FIG. 1, two liquid discharge heads are illustrated. However, in some embodiments, the number of liquid discharge heads is one or three or more.

The carriage 51 is movably held with guides 54 and 55. The guides 54 and 55 are held with lateral side plates 70 so as to be movable upward and downward.

Via a pulley and a belt, an X-direction scanning motor constituting an X-direction scanning assembly 550 reciprocally moves the carriage 51 along the direction indicated by arrow X that is a main scanning direction. Note that, hereinafter, the direction indicated by arrow X is simply referred to as "X direction", and the same applies to "Y direction" and "Z direction".

Each of the two heads 52a and 52b (hereinafter, referred to as "heads 52" unless distinguished) includes two nozzle rows, each including a plurality of nozzles arrayed to discharge fabrication liquid. Two nozzle rows of one head 52a discharge, for example, cyan fabrication liquid and magenta fabrication liquid. Two nozzle rows of the other head 52a discharge, for example, yellow fabrication liquid and black fabrication liquid. Note that the configuration of head is not limited to the above-described configuration of the head 52 and may be any other suitable configuration.

A tank mount 56 mounts a plurality of tanks 60 containing cyan fabrication liquid, magenta fabrication liquid, yellow fabrication liquid, and black fabrication liquid. The fabrication liquids are supplied to the heads 52a and 52b through, e.g., supply tubes.

Further, a maintenance assembly 61 to maintain and recover the heads 52 of the liquid discharge unit 50 in good condition is disposed at one end in the X direction.

The maintenance assembly 61 includes caps 62 and a wiper 63. The caps 62 are brought into close contact with nozzle faces (nozzle formed faces) of the heads 52, and fabrication liquid is sucked from nozzles. Thus, powder clogged at the nozzles and thickened fabrication liquid are discharged. Then, the wiper 63 wipes the nozzle faces to form menisci in the nozzles (with the interiors of the nozzles being in negative pressure state). When fabrication liquid is not discharged, the maintenance assembly 61 covers the nozzle faces of the heads 52 with the caps 62 to prevent incorporation of powder 20 into nozzles and drying of the fabrication liquid 10.

The fabrication unit 5 includes a slider portion 72 slidably supported on a guide 71 above a base 7. The entire fabrication unit 5 is reciprocally movable in the Y direction perpendicular to the X direction. The entire fabrication unit 5 is reciprocally moved along the Y direction by the Y-direction scanning assembly 552.

The liquid discharge unit 50 is disposed to be movable upward and downward along the Z direction together with the guides 54 and 55. A Z-direction elevation assembly 551 moves the liquid discharge unit 50 upward and downward along the Z direction.

In the following, the fabrication section 1 is further described.

The powder chamber 11 has a box shape and includes three chambers, the supply chamber 21, the fabrication chamber 22, and the surplus powder receiver 29, each of which is open at the upper side thereof. The supply stage 23 and the fabrication stage 24 are arranged inside the supply chamber 21 and the fabrication chamber 22, respectively, so as to be movable upward and downward.

Lateral faces of the supply stage 23 are disposed to contact inner lateral faces of the supply chamber 21. Lateral faces of the fabrication stage 24 are disposed to contact inner lateral faces of the fabrication chamber 22. The upper faces of the supply stage 23 and the fabrication stage 24 are held horizontally.

The surplus powder receiver 29 is disposed adjacent to the fabrication chamber 22.

A surplus of the powder 20 transferred and supplied with the flattening roller 12 in formation of a powder layer 31 falls to the surplus powder receiver 29. Surplus powder 20 having fallen to the surplus powder receiver 29 is returned to a powder supplier 554 that supplies powder to the supply chamber 21.

Figure 5:
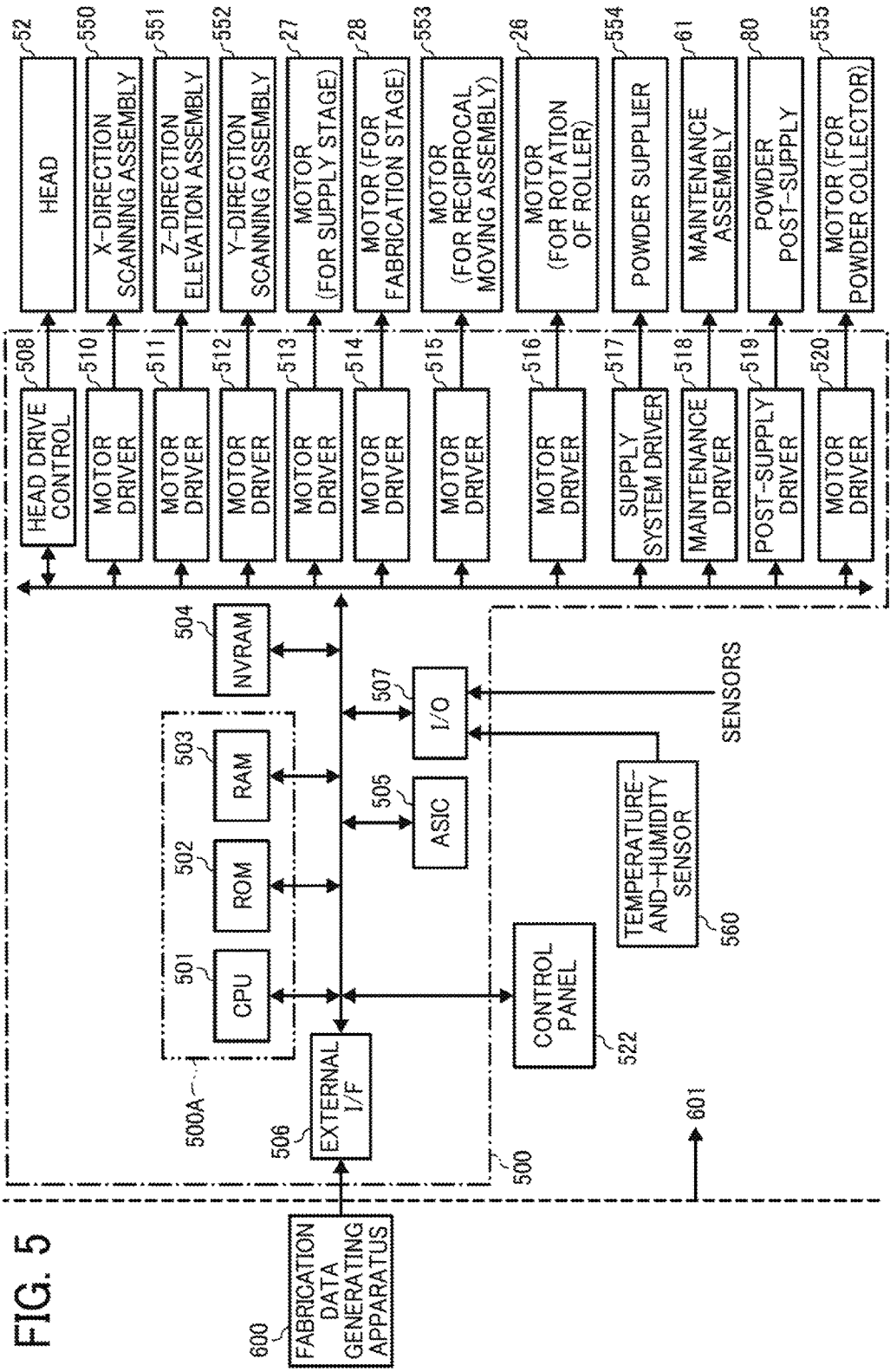
FIG. 5 is a block diagram of a controller of the three-dimensional fabricating apparatus.

The powder supplier 554 illustrated in FIG. 5 is disposed above the supply chamber 21. In an initializing operation of fabrication or when the amount of powder in the supply chamber 21 decreases, powder in a tank constituting the powder supplier 554 is supplied to the supply chamber 21. Examples of a powder transporting method for supplying powder include a screw conveyor method utilizing a screw and an air transport method utilizing air.

The flattening roller 12 transfers and supplies powder 20 from the supply chamber 21 to the fabrication chamber 22 and evens and flattens the surface of the powder 20 to form a powder layer 31 as a layered powder having a desired thickness.

The flattening roller 12 is a bar longer than an inside dimension of the fabrication chamber 22 and the supply chamber 21 (that is, a width of a portion to which powder is supplied or stored). The reciprocal moving assembly 25 reciprocally moves the flattening roller 12 in the Y direction (a sub-scanning direction) along the stage surface.

The flattening roller 12, while being rotated by the motor 26, horizontally moves to pass an area above the supply chamber 21 and the fabrication chamber 22 from the outside of the supply chamber 21. Accordingly, the powder 20 is transferred and supplied onto the fabrication chamber 22, and the flattening roller 12 flattens the powder 20 while passing over the fabrication chamber 22, thus forming the powder layer 31.

As illustrated in FIG. 2, a powder removal plate 13 serving as a powder remover to remove the powder 20 attached to the flattening roller 12 is disposed in contact with a circumferential surface of the flattening roller 12.

The powder removal plate 13 moves together with the flattening roller 12 in contact with the circumferential surface of the flattening roller 12.

Next, an outline of a controller of the three-dimensional fabricating apparatus in this embodiment is described with reference to FIG. 5. FIG. 5 is a block diagram of a controller of the three-dimensional fabricating apparatus 601 according to an embodiment of this disclosure.

A controller 500 serving as the controller includes a main controller 500A. The main controller 500A includes a central processing unit (CPU) 501, a read-only memory (ROM) 502, a random access memory (RAM) 503, a non-volatile random access memory (NVRAM) 504, and an application-specific integrated circuit (ASIC) 505. The CPU 501 manages the control of the entire three-dimensional fabricating apparatus 601. The ROM 502 stores programs executed by the CPU 501 and other fixed data. The programs stored in the ROM 502 include programs for causing the CPU 501 to execute control of three-dimensional fabricating operation which includes control according to embodiments of the present disclosure. The RAM 503 temporarily stores fabrication data and other data.

The NVRAM 504 retains data even when the apparatus is powered off. The ASIC 505 performs image processing, such as processing of various signals on image data, and processes input and output signals to control the entire apparatus.

The controller 500 also includes an interface (I/F) 506 to send and receive data and signals used in receiving fabrication data from an external fabrication data generation apparatus 600. The fabrication data generating apparatus 600 generates fabrication data in which a final-form object is sliced in multiple fabrication layers, and is constituted of an information processing apparatus, such as a personal computer.

The controller 500 includes an input-output (I/O) unit to receive detection signals of various sensors.

The controller 500 includes a head drive controller 508 to control driving of each head 52 of the liquid discharge unit 50.

The controller 500 includes a motor driver 510 and a motor driver 512. The motor driver 510 drives a motor constituting the X-direction scanning assembly 550 to move the carriage 51 of the liquid discharge unit 50 in the X direction (the main scanning direction). The motor driver 512 drives a motor constituting the Y-direction scanning assembly 552 to move the fabrication unit 5 in the Y direction (the sub-scanning direction).

The controller 500 includes a motor driver 511 to drive a motor constituting the Z-direction elevation assembly 551 to move (elevate) the carriage 51 of the liquid discharge unit 50 upward and downward in the Z direction. Note that the fabrication unit 5 may be elevated in the direction indicated by arrow Z.

The controller 500 includes a motor driver 513 and a motor driver 514. The motor driver 513 drives the motor 27 to elevate the supply stage 23 upward and downward. The motor driver 514 drives the motor 28 to elevate the fabrication stage 24 upward and downward.

The controller 50X) includes a motor driver 515 and a motor driver 516. The motor driver 515 drives a motor 553 of the reciprocal moving assembly 25 to move the flattening roller 12. The motor driver 516 includes the motor 26 to rotate the flattening roller 12.

The controller 500 includes a supply system driver 517 and a maintenance driver 518. The supply system driver 517 drives the powder supplier 554 to supply powder 20 to the supply chamber 21. The maintenance driver 518 drives the maintenance assembly 61 of the liquid discharge unit 50.

The controller 500 includes a post-supply driver 519 to cause a powder post-supply 80 to supply the powder 20.

The controller 500 includes a motor driver 520 to drive a motor 555 to rotate transfer screws 97 of a powder collector 90.

The I/O unit 507 receives detection signals from, e.g., a temperature-and-humidity sensor 560 to detect temperature and humidity as environmental conditions of the apparatus and detection signals from other sensors.

The controller 500 is connected to a control panel 522 for inputting and displaying information necessary to the three-dimensional fabricating apparatus 601.

Note that the fabrication data generation apparatus 600 and the three-dimensional fabricating apparatus (powder lamination fabrication apparatus) 601 constitutes a fabrication system according to an embodiment of the present disclosure.

Next, a flow of fabrication steps is described with reference to FIGS. 6A through 6E. FIGS. 6A through 6E are schematic illustration of the flow of fabrication steps.

First, a description is given of a state in which a first fabrication layer 30 is formed on the fabrication stage 24 of the fabrication chamber 22.

Figure 6A:
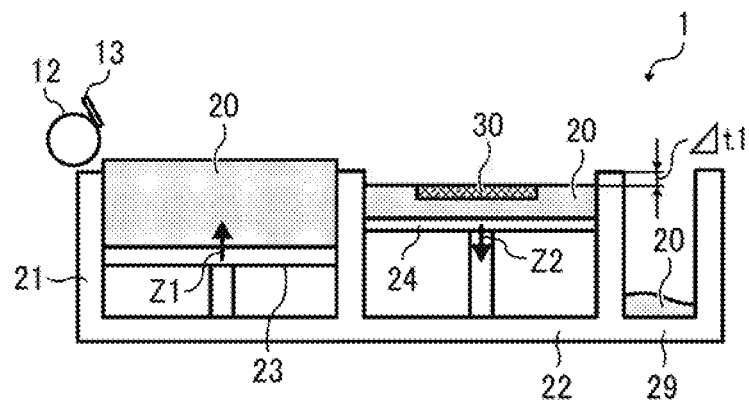
FIGS. 6A through 6E are cross-sectional views of the fabrication section at fabrication steps.

When a second fabrication layer 30 is formed on the first fabrication layer 30, as illustrated in FIG. 6A, the supply stage 23 of the supply chamber 21 moves upward in a direction indicated by arrow Z1, and the fabrication stage 24 of the fabrication chamber 22 moves downward in a direction indicated by arrow Z2.

At this time, a downward movement distance of the fabrication stage 24 is set so that a distance between a surface of a powder layer 31 and a lower portion (lower tangential portion) of the flattening roller 12 is $\Delta t1$. The distance $\Delta t1$ corresponds to the thickness (lamination pitch) of the powder layer 31 to be formed next. The distance $\Delta t1$ is preferably about several tens μm to about 300 μm.

Figure 6B:
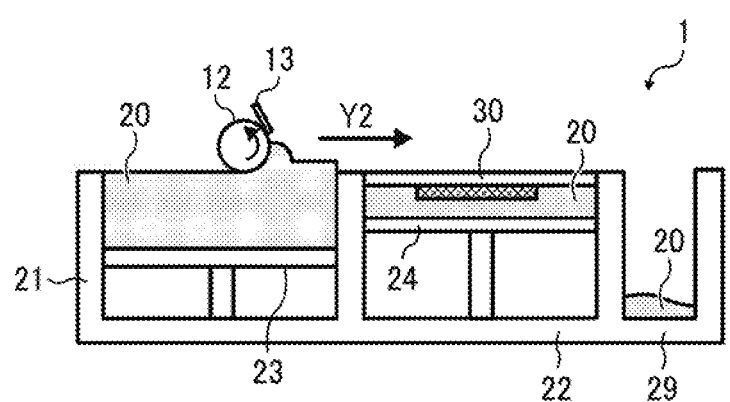

Next, as illustrated in FIG. 6B, by moving the flattening roller 12 in a direction indicated by arrow Y2 toward the fabrication chamber 22 while rotating the flattening roller 12 in a forward direction (indicated by arrow R), powder 20 upper than the level of a top face of the supply chamber 21 is transferred and supplied to the fabrication chamber 22 (powder supply).

Figure 6C:
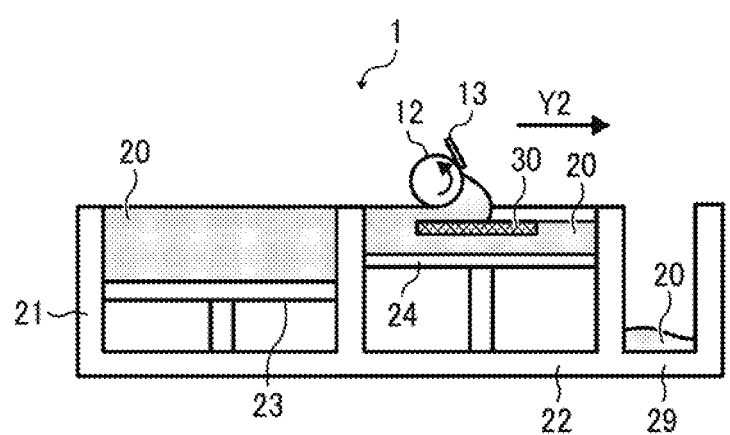
Figure 6D:
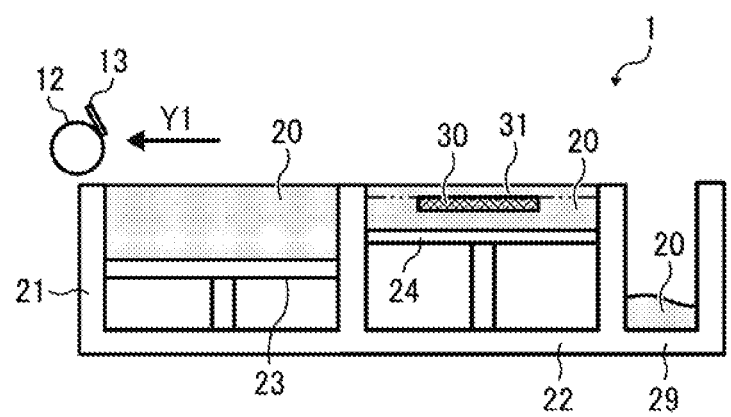

As illustrated in FIG. 6C, the flattening roller 12 is moved in parallel to the stage surface of the fabrication stage 24 of the fabrication chamber 22 to supply the powder 20 to the fabrication chamber 22 while evening the powder 20 (the term "flattening" means "supplying" and "evening"). Thus, as illustrated in FIG. 6D, the powder layer 31 having a predetermined thickness $\Delta t1$ is formed on the first fabrication layer 30 of the fabrication stage 24. At this time, the surplus powder 20, which has not been used for the formation of the powder layer 31, falls into the surplus powder receiver 29.

After the powder layer 31 is formed, as illustrated in FIG. 6D, the flattening roller 12 is moved in the direction indicated by arrow Y1 and returned to an initial position (original position).

Here, the flattening roller 12 is movable while maintaining a constant distance between the fabrication chamber 22 and the level of the top face of the supply chamber 21. Such a configuration allows formation of a uniform thickness $\Delta t1$ of the powder layer 31 on the fabrication chamber 22 or the fabrication layer 30 already formed while transporting the powder 20 to an area above the fabrication chamber 22 with the flattening roller 12.

Figure 6E:
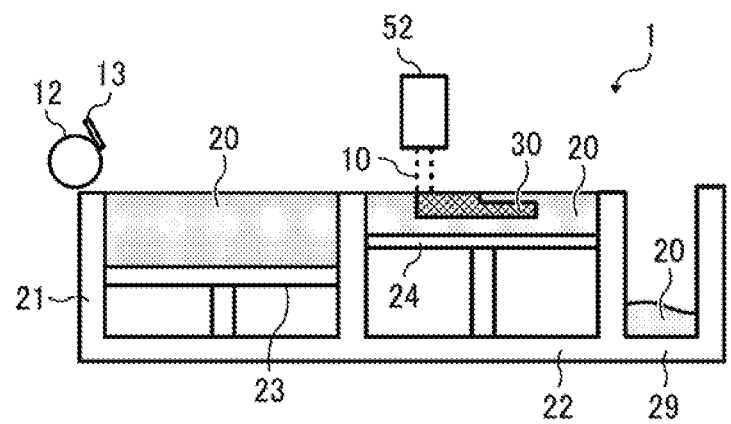

Then, as illustrated in FIG. 6E, droplets of fabrication liquid 10 are discharged from the heads 52 of the liquid discharge unit 50 to form and laminate the fabrication layer 30 on the powder layer 31 (fabrication).

For the fabrication layer 30, for example, when the fabrication liquid 10 discharged from the head 52 is mixed with the powder 20, adhesives contained in the powder 20 dissolve and bond together. Thus, particles of the powder 20 bind together to form the fabrication layer 30.

Next, the step of forming the powder layer 31 by the above-described powder supply and flattening and the step of discharging the fabrication liquid with the heads 52 are repeated to form a new fabrication layer 30. At this time, a new fabrication layer 30 and the fabrication layer 30 below the new fabrication layer 30 are united to form part of a three-dimensional fabrication object.

Then, the step of forming the powder layer 31 by the powder supply and flattening and the step of discharging the fabrication liquid with the heads 52 are repeated a required number of times to finish the three-dimensional fabrication object (solid fabrication object).

Figure 7:
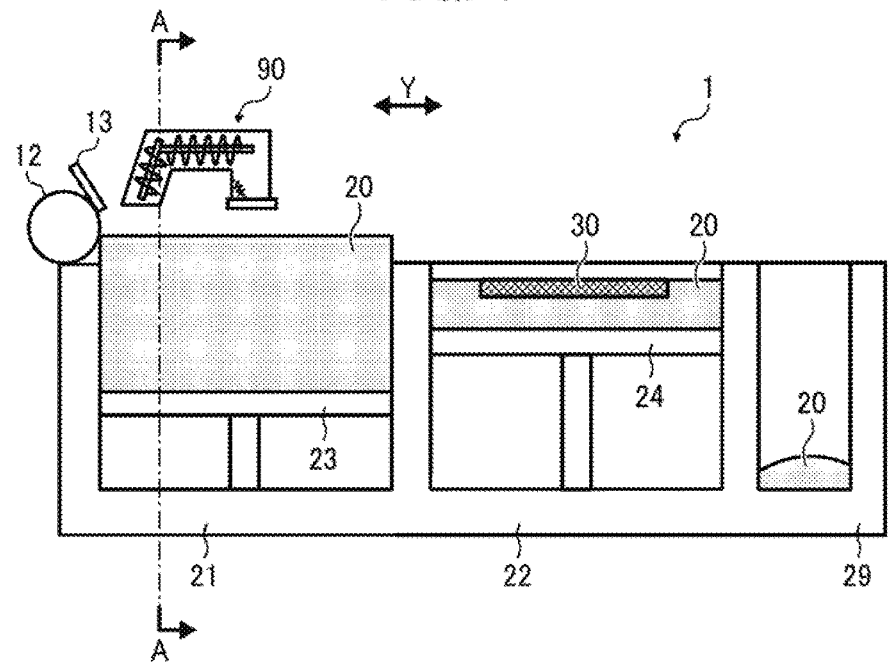
FIG. 7 is a schematic view of the fabrication section according to a first embodiment of the present disclosure.
Figure 8:
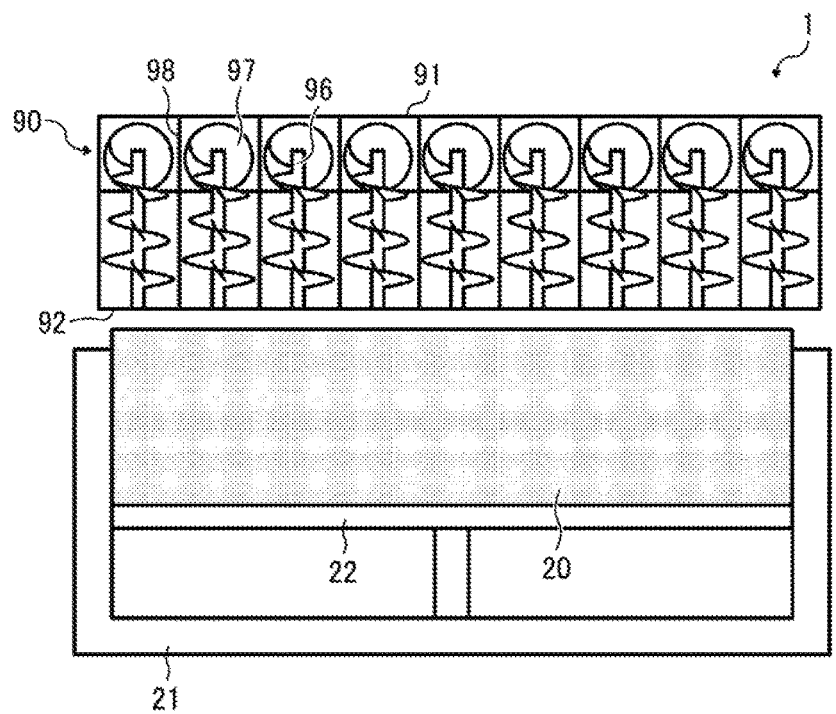
FIG. 8 is a schematic cross-sectional view of the fabrication section cut along A-A line of FIG. 7.
Figure 9:
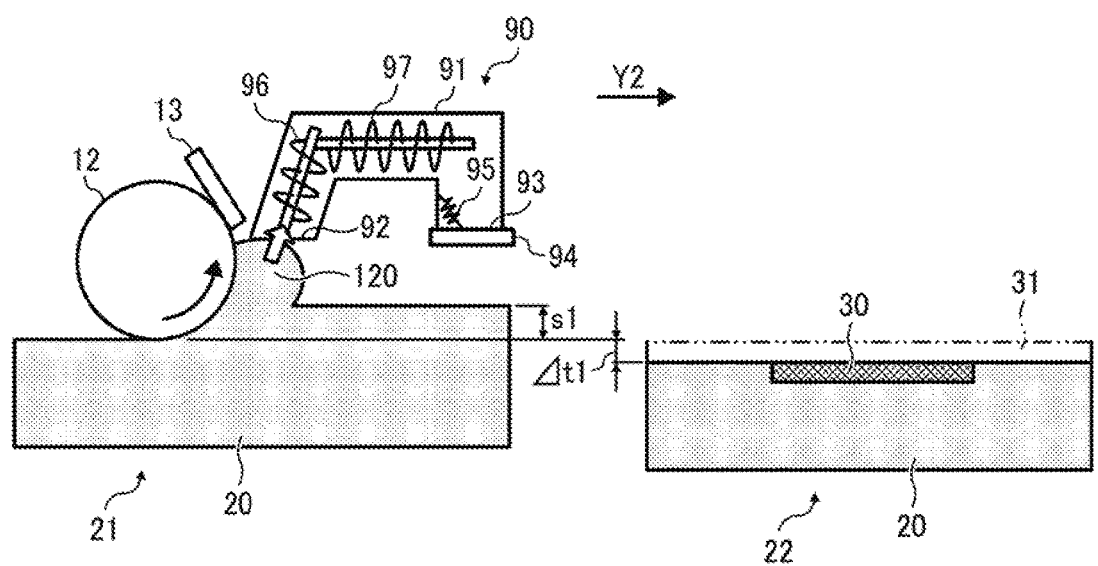
FIG. 9 is an enlarged view of the fabrication section during powder supply.

Next, a first embodiment of the present disclosure is described with reference to FIGS. 7 to 9. FIG. 7 is a schematic view of the fabrication section according to the first embodiment of the present disclosure. FIG. 8 is a schematic cross-sectional view of the fabrication section cut along A-A line of FIG. 7. FIG. 9 is an enlarged view of the fabrication section during powder supply.

In this embodiment, the fabrication section 1 includes the powder collector 90 to collect a portion of the powder 20 transferred and supplied with the flattening roller 12. The fabrication section 1 also discharges and supplies the collected powder 20 to the supply chamber 21 when the flattening roller 12 returns to the supply chamber 21.

The powder collector 90 is disposed forward (downstream) from the flattening roller 12 in a transfer direction of the flattening roller 12 and movable with movement of the flattening roller 12.

In this embodiment, the powder collector 90 includes a body container 91 to contain the powder 20. The body container 91 includes a collection port 92 to introduce the powder 20 and a discharge port 93 to discharge the powder 20 contained in the body container 91.

Each of the collection port 92 and the discharge port 93 of the body container 91 is open downward and disposed at a position higher than a tangent of the flattening roller 12 and the surface of the powder 20. In the body container 91, the collection port 92 is disposed proximal to the flattening roller 12 and the discharge port 93 is disposed distal to the flattening roller 12.

Since the flattening roller 12 transfers and supplies the powder 20 while rotating in the same direction of the direction of movement, as illustrated in FIG. 9, the powder 20 is heaped to form a powder heap 120 in front of the flattening roller 12 in the direction of movement of the flattening roller 12. The collection port 92 of the powder collector 90 is disposed adjacent to the flattening roller 12 to collect the powder 20 of the powder heap 120.

The body container 91 includes a lid 94 as a shutter to open and close the discharge port 93. The lid 94 is normally held in a closed state by a spring 95.

The body container 91 includes transfer screws 96 and 97 to transfer the powder 20 in the Z direction and the Y direction, respectively. As illustrated in FIG. 8, the plurality of transfer screws 96 and the plurality of transfer screws 97 are disposed in the direction (X direction) perpendicular to the transfer direction (Y direction) of the flattening roller 12. Partitions 98 are disposed between adjacent pairs of the transfer screws 96 and the transfer screws 97.

When the transfer screw 96 is used as a transfer unit to transfer the powder 20 into the body container 91, the transfer screw 96 is disposed in a state in which a leading end of the transfer screw 96 is in contact with the powder heap 120. Such a configuration allows the transfer screws 97 to screw up the powder 20 of the powder heap 120.

Note that the transfer screws 96 and the transfer screws 97 are rotated by the motor 555.

In some embodiments, a common drive source may be used to drive and rotate the transfer screws 96 and the transfer screws 97 and the flattening roller 12.

In such a case, a transmission gear is connected to a drive output shaft of the motor 26 to rotate the flattening roller 12, and a rotation shaft of the flattening roller 12 and rotation shafts of the transfer screws 96 and the transfer screws 97 are connected to the transmission gear. When the motor 26 is driven, the transmission gear rotates. The rotation force of the transmission gear is transmitted to the flattening roller 12 and the transfer screws 96 and the transfer screws 97, thus rotating the flattening roller 12 and the transfer screws 96 and the transfer screws 97.

Such a configuration obviates a separate driving source dedicated to the transfer screws 96 and the transfer screws 97, thus allowing downsizing of the apparatus and cost reduction.

Here, the powder collector 90 moves with movement of the flattening roller 12. In such a case, the powder collector 90 and the flattening roller 12 may be moved in synchronous with each other by separate moving devices. In some embodiments, the powder collector 90 and the flattening roller 12 may be disposed on, for example, a single common base to form a single unit so that the powder collector 90 and the flattening roller 12 can be moved by a moving device that moves the common base.

Next, a flow of fabrication in this embodiment is described with reference to FIGS. 10A through 10E. FIGS. 10A through 10E are schematic illustration of the flow of fabrication steps.

First, a description is given of a state in which a first fabrication layer 30 is formed on the fabrication stage 24 of the fabrication chamber 22.

Figure 10A:
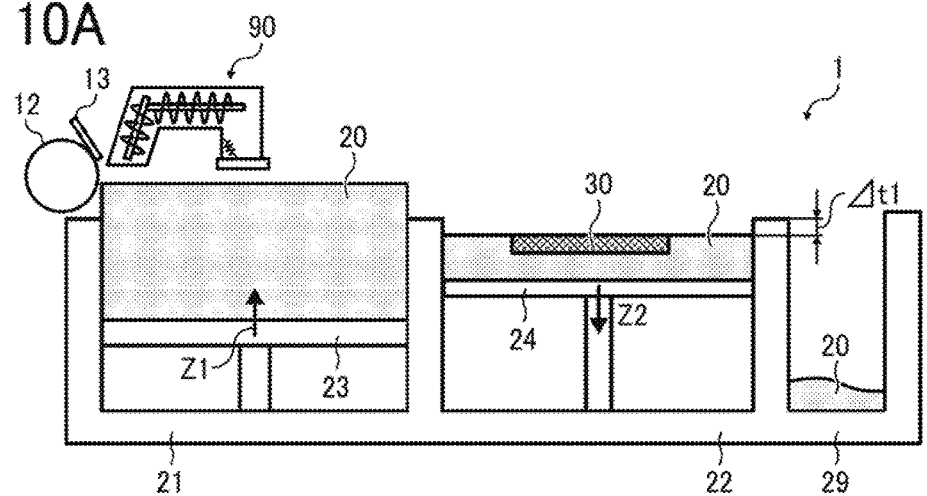
FIGS. 10A through 10E are illustrations of a flow of fabrication in the first embodiment.

When a second fabrication layer 30 is formed on the first fabrication layer 30, as illustrated in FIG. 10A, the supply stage 23 of the supply chamber 21 moves upward in a direction indicated by arrow Z1, and the fabrication stage 24 of the fabrication chamber 22 moves downward in a direction indicated by arrow Z2.

At this time, a downward movement distance of the fabrication stage 24 is set so that a distance between an upper surface (a surface of a powder layer 31) of the fabrication chamber 22 and a lower portion (lower tangential portion) of the flattening roller 12 is Δt1. By contrast, as illustrated in FIG. 9, the supply stage 23 of the supply chamber 21 is raised to a height s1 at which a greater amount of powder is obtained than an amount of powder at which the powder layer 31 is formed at the thickness Δt1, indicated by an imaginary line (broken line).

Figure 10B:
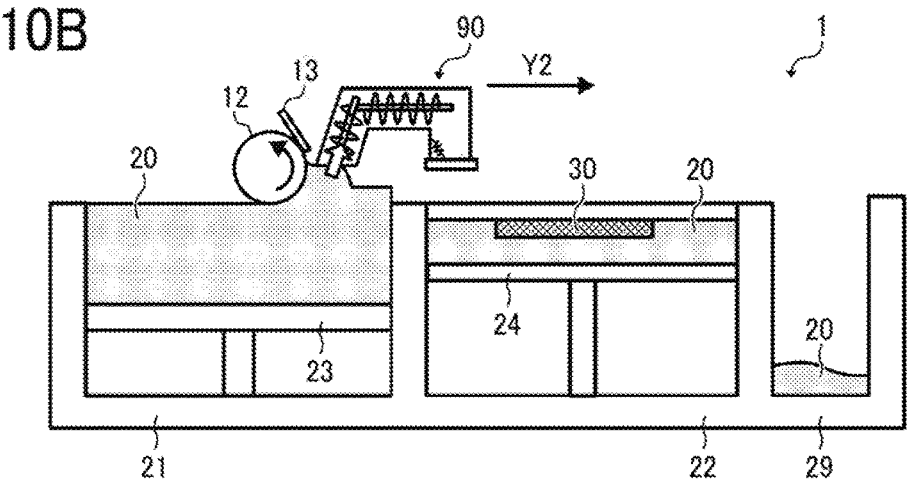

Next, as illustrated in FIG. 10B, by moving the flattening roller 12 in a direction indicated by arrow Y2 toward the fabrication chamber 22 while rotating the flattening roller 12 in a forward direction (indicated by arrow R), powder 20 upper than the level of a top face of the supply chamber 21 is transferred and supplied to the fabrication chamber 22 (powder supply).

At this time, the transfer screws 96 and the transfer screws 97 in the powder collector 90 are rotated to take in and collect the powder 20 (also surplus powder), which is scraped up with the flattening roller 12 and introduced into the collection port 92, and transfer the powder 20 toward the discharge port 93. Note that, since the discharge port 93 is closed, the transferred powder 20 is not discharged from the discharge port 93.

In other words, by synchronizing the motor driver 520, which drives the motor 555 to rotate the transfer screws 96 and the transfer screws 97, with the motor driver 516, which drives the motor 26 to rotate the flattening roller 12, the transfer screws 97 screws up the powder 20 during rotation of the flattening roller 12, thus transferring the powder 20 into the body container 91.

Figure 10C:
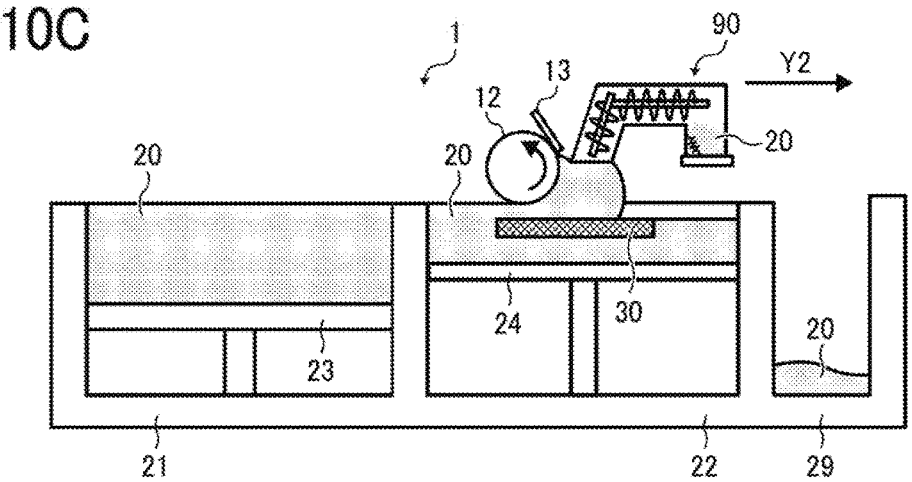

As illustrated in FIG. 10C, the flattening roller 12 is moved in parallel to the stage surface of the fabrication stage 24 of the fabrication chamber 22, to supply the powder 20 into the fabrication chamber 22 while evening the powder 20. Thus, a powder layer 31 having a thickness of Δt1 is formed on the fabrication layer 30 of the fabrication stage 24 (flattening).

At this time, until the formation of the powder layer 31 ends, a portion of the powder 20 transferred with the flattening roller 12, which is not used for the formation of the powder layer 31, is introduced from the collection port 92 of the powder collector 90) and collected into the body container 91. The portion of the powder 20, while being transferred toward the discharge port 93, is contained in the body container 91.

Figure 10D:
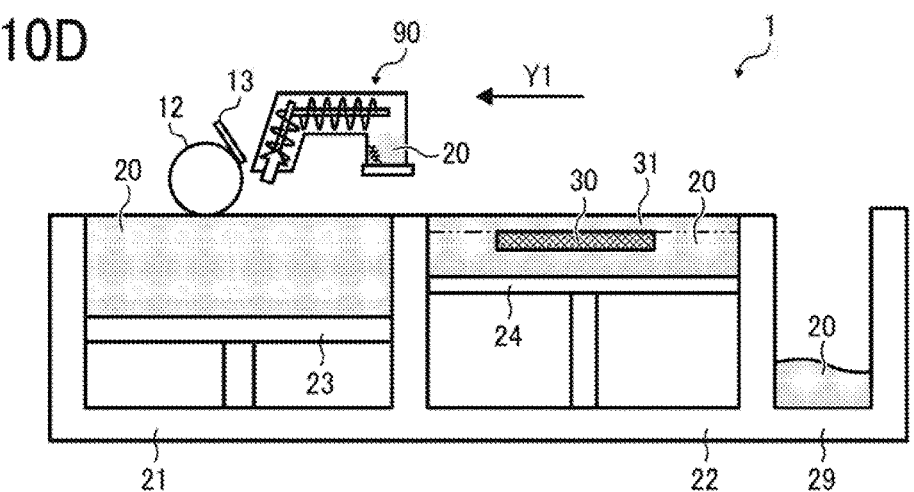

After the powder layer 31 is formed, as illustrated in FIG. 10D, the flattening roller 12 is moved in the direction indicated by arrow Y1 and returned to the initial position. At this time, the powder collector 90 is also returned to above the supply chamber 21, together with the flattening roller 12.

Figure 10E:
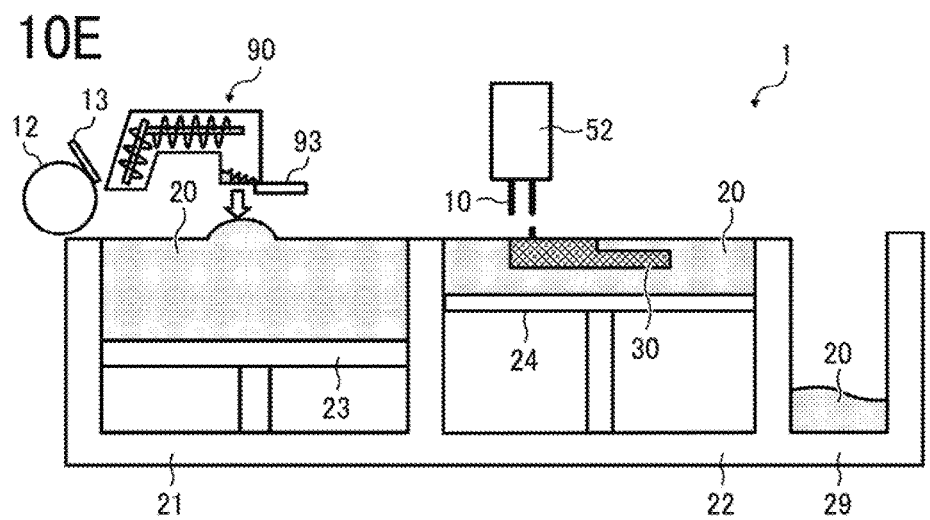

Then, as illustrated in FIG. 10E, droplets of fabrication liquid 10 are discharged from the heads 52 of the liquid discharge unit 50 to form and laminate the next fabrication layer 30 on the powder layer 31 (fabrication).

When the lid 94 of the discharge port 93 of the powder collector 90 is open, the powder 20 collected and contained in the powder collector 90 is discharged from the discharge port 93 and resupplied onto the powder 20 in the supply chamber 21.

Accordingly, when the next powder layer 31 is formed, the collected powder 20 is resupplied.

As described above, the powder collector includes the body container to contain the powder inside. The body container includes the collection port to introduce the powder and the discharge port to discharge the powder contained in the body container. When the powder is transferred and supplied with the flattening unit, a portion of the powder is collected and contained in the body container. When the flattening unit is returned to above the supply chamber, the powder contained in the body container is discharged and supplied into the supply chamber.

Note that the period of "when the powder is transferred and supplied with the flattening unit" may be, for example, "when the flattening unit transfers and supplies the powder into the fabrication chamber", "when the flattening unit passes above the supply chamber", and "when the flattening unit passes above the fabrication chamber".

Thus, surplus powder is collected and reused with a simple configuration, thus enhancing the utilization ratio of the powder.

As described above, the powder, which has been collected and supplied with (having fallen into) the surplus powder collector, is reused for powder supply to form a powder layer to fabricate the next fabrication layer, thus reducing the amount at which the stage of the supply chamber is raised in the Z1 direction. Such a configuration allows size reduction of the fabrication chamber.

Since surplus powder in fabrication can be collected, the surplus powder chamber can be downsized, thus allowing downsizing of the entire apparatus.

As the amount of powder transferred and supplied with the flattening roller 12 as the flattening unit is greater, the powder heap formed in front of the flattening roller 12 illustrated in FIG. 9 is greater and the powder is more likely to be scattered with rotation of the flattening roller 12 during transfer and supply operation. However, in this embodiment, a portion of powder of the powder heap is collected when the flattening roller 12, while rotating, transfers and supplies the powder to the fabrication chamber, thus reducing scattered powder.

In the above-described embodiment, when the flattening roller 12 is moved from the supply chamber 21 side, the transfer screws 96 and the transfer screws 97 are rotated to collect a portion of the powder 20 while the powder 20 is transferred to the fabrication chamber 22. However, in some embodiments, the transfer screws 96 and the transfer screws 97 may not be rotated when the flattening roller 12 is moved from the supply chamber 21 side.

Figure 11:
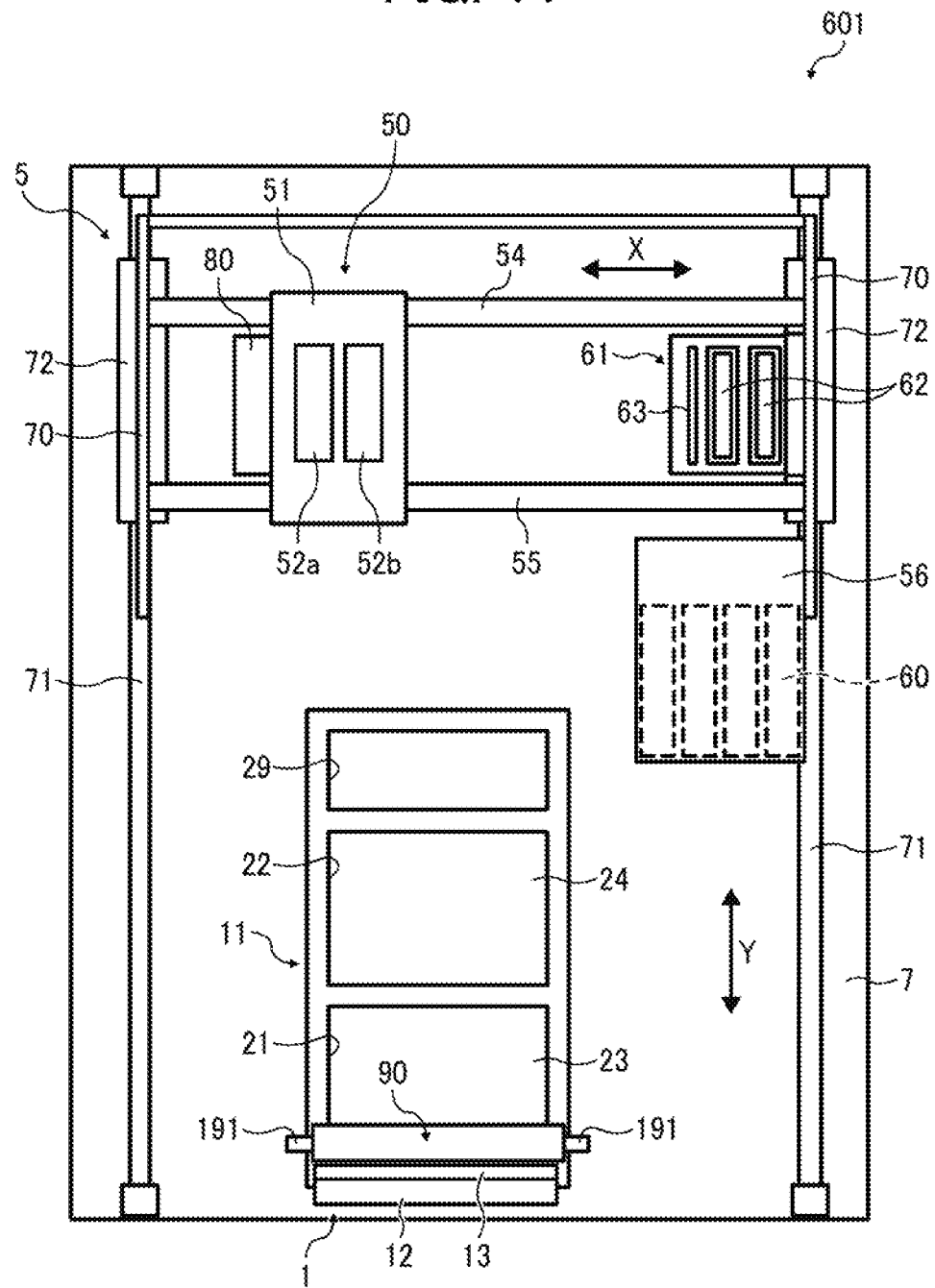
FIG. 11 is a plan view of the fabrication section according to a second embodiment of the present disclosure.

Next, a second embodiment of the present disclosure is described with reference to FIGS. 11 and 12. FIG. 11 is a plan view of the fabrication section 1 according to the second embodiment. FIG. 12 is an illustration of opening and closing operation of the lid of the discharge port of the powder collector.

Figure 12A:
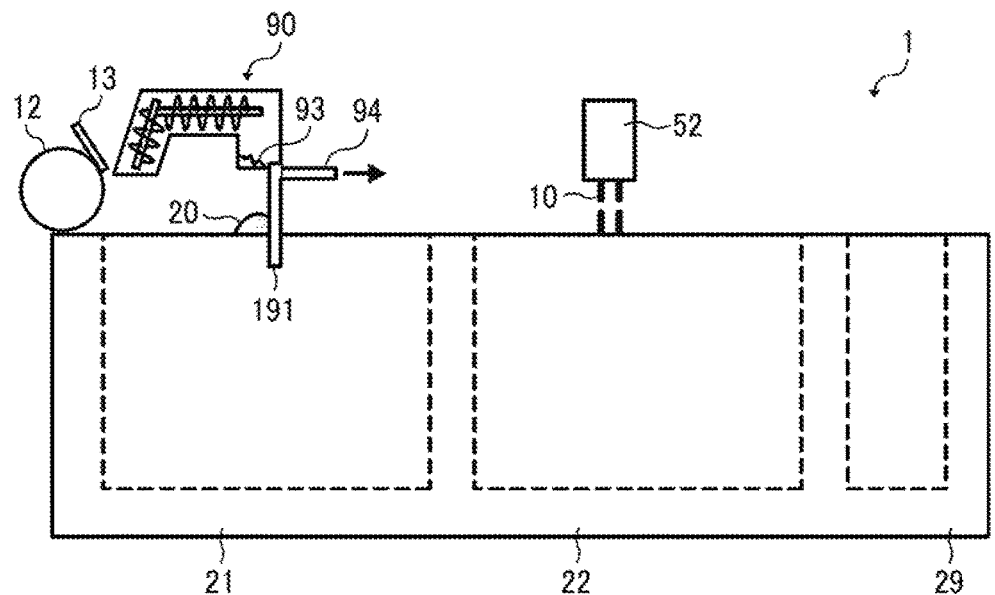
FIGS. 12A and 12B are illustrations of opening and closing operation of the lid of a discharge port of a powder collector in the second embodiment.
Figure 12B:
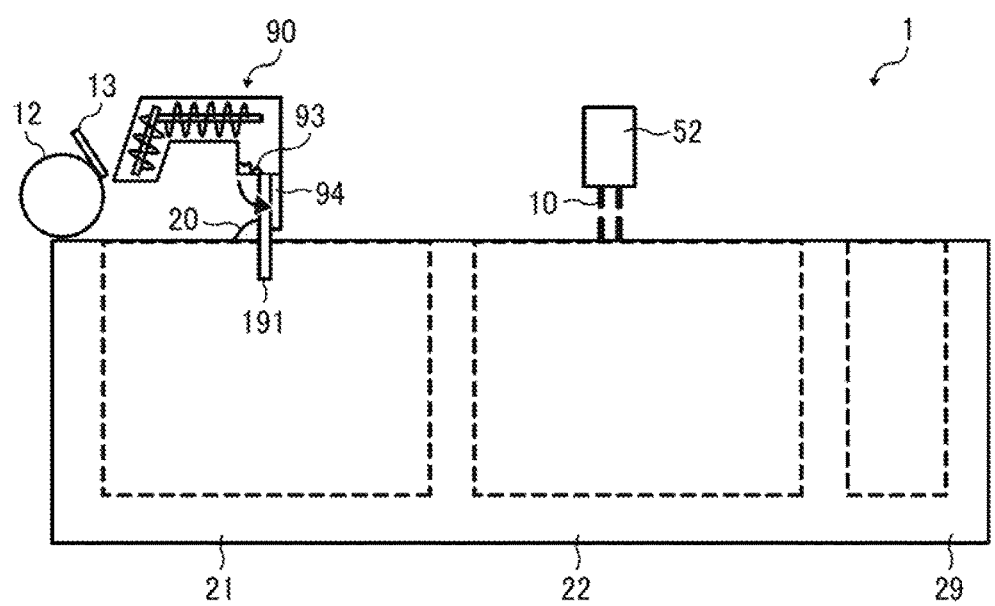

In this embodiment, for example, as illustrated in FIG. 12A, the lid 94 to open and close the discharge port 93 of the powder collector 90 is held on the body container 91 to be slidable. The lid 94 is also always biased by the spring 95 in a direction to close the discharge port 93. In some embodiments, as illustrated in FIG. 12B, the lid 94 to open and close the discharge port 93 of the powder collector 90 is held on the body container 91 to be rotatable. The lid 94 is also always biased by the spring 95 in a direction to close the discharge port 93.

By contrast, at the supply chamber 21 side, lid opening pins 191 are disposed at both ends in the direction indicated by arrow X, to engage and slide the lid 94 when the powder collector 90 is returned to the initial position (see FIG. 12A). In some embodiments, the lid opening pins 191 are disposed to engage and rotate the lid 94 when the powder collector 90 is returned to the initial position (see FIG. 12B).

In some embodiments, the lid opening pins and 191 may be disposed on an upper face of the supply chamber 21.

With such a configuration, by only returning the powder collector 90 to the initial position, the lid 94 is mechanically open and the discharge port 93 is open. Thus, the collected powder 20 is discharged (supplied) to the supply chamber 21, and the configuration of opening and closing the discharge port 93 is simplified.

Figure 13:
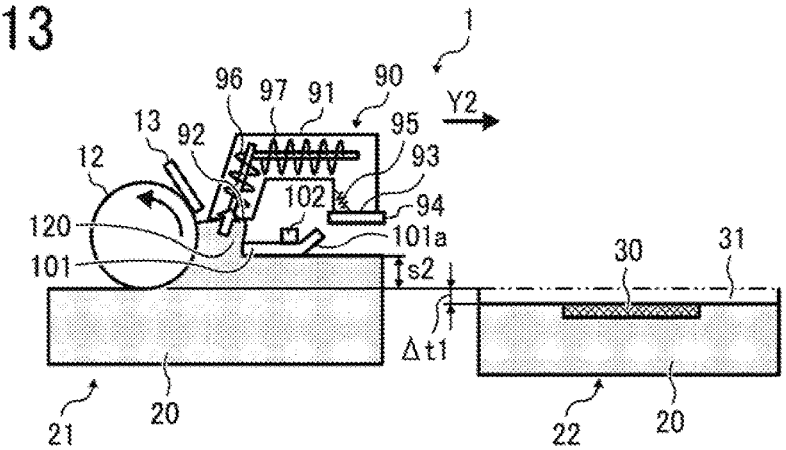
FIG. 13 is an illustration of the fabrication section according to a third embodiment of the present disclosure.

Next, a third embodiment of the present disclosure is described with reference to FIG. 13. FIG. 13 is an illustration of the fabrication section 1 in the third embodiment.

In this embodiment, a vibration blade 101 is disposed downstream from the flattening roller 12 in the transfer direction of the flattening roller 12 and below the powder collector 90. The vibration blade 101 as a vibration applicator applies vibration to the powder 20 transferred and supplied.

The vibration blade 101 moves together with the flattening roller 12 and has an inclined portion 101a inclined upwardly toward the font side in the direction of movement. The vibration blade 101 is vibrated by, for example, a piezoelectric vibrator 102.

In other words, to increase the density of the first fabrication layer 30 and fabricate the fabrication object at an increased hardness, the fabrication section 1 supplies the powder 20 while beating the powder 20 with the vibration blade 101 before flattening. In such a case, it is preferably to secure a certain distance between a vibration surface of the vibration blade 101 and a surface of the powder 20 to prevent the fabrication layer 30 below the powder 20 from collapsing or shifting due to vibration of the vibration blade 101.

Hence, though depending on the type and properties of the powder 20, the storage condition of the powder 20, and the driving condition of the flattening roller 12 (recoater), a supply height s2 in the supply chamber 21 may be set to be not less than twice as high as the thickness (lamination pitch) Δt1 of the powder layer 31.

The supply height s2 is higher than the supply height S1 of the configuration in which the vibration blade 101 is not used as in the above-described first embodiment.

Accordingly, the size of the supply chamber 21 would increase. In addition, since the amount of surplus powder 20 increase, the size of the surplus powder receiver 29 would increase.

Hence, in this embodiment, the fabrication section 1 includes the powder collector 90, thus suppressing an increase of the size of the supply chamber 21 or the surplus powder receiver 29.

Figure 14:
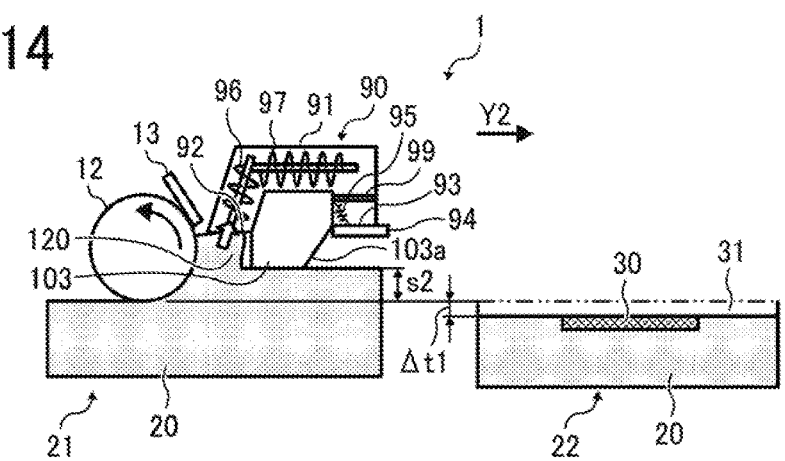
FIG. 14 is an illustration of the fabrication section according to a fourth embodiment of the present disclosure.

Next, a fourth embodiment of this disclosure is described with reference to FIG. 14. FIG. 14 is an illustration of the fabrication section 1 in the third embodiment.

In this embodiment, the body container 91 and a vibration applicator 103 of the powder collector 90 are integrally molded as a single unit. In such a case, a portion of the body container 91 of the powder collector 90 may constitute the vibration applicator 103 to contact the powder 20. Alternatively, the body container 91 and the vibration applicator 103 may be separate components.

The vibration applicator 103 moves together with the flattening roller 12 and has an inclined portion 103a inclined upwardly toward the font side in the direction of movement.

In such a case, a passage to transfer the powder 20 collected in the body container 91 is preferably partitioned from a contact face as the vibration applicator 103 to contact the surface of the powder 20

A mesh member 99 is preferably disposed upstream from the discharge port 93 of the body container 91. The collected powder 20 may include large aggregated particles. Accordingly, the collected powder 20 may be sieved into fine powder when the collected powder 20 is discharged and supplied into the supply chamber 21.

Hence, the mesh member 99 is disposed upstream from the discharge port 93, thus obtaining a similar effect to that of the configuration in which the powder 20 is sieved by the vibration of the vibration applicator 103.

In such a configuration, an additional driving device to sieve the collected powder 20 is not necessary, thus preventing upsizing of the powder collector 90.

Note that, since the vibration applicator is to press the powder layer 31 on the fabrication chamber 22, it is sufficient to drive the vibration applicator only when the vibration applicator is placed above the fabrication chamber 22. However, for the configuration in which the piezoelectric vibrator is used, the piezoelectric vibrator is driven from when the piezoelectric vibrator is placed above the supply chamber 21, to more stabilize 25 the vibration properties.

Figure 15:
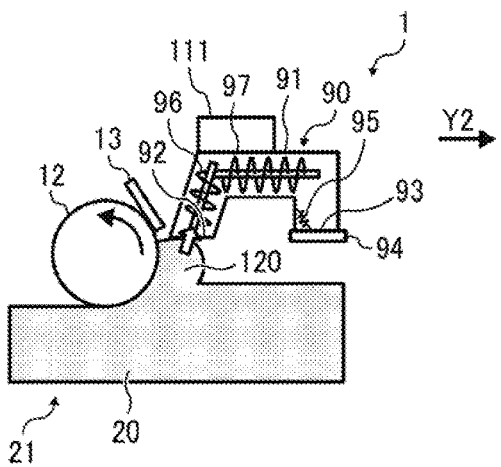
FIG. 15 is an illustration of a supply chamber part in a fifth embodiment of the present disclosure.

Next, a fifth embodiment of the present disclosure is described with reference to FIGS. 15 and 16. FIG. 15 is an illustration of a supply chamber part in the fifth embodiment. FIGS. 16A through 16E are illustrations of a flow of fabrication in the fifth embodiment.

In this embodiment, the powder collector 90 includes an air suction device 11l to suck air.

The air suction device 111 is disposed on an upper face of the body container 91 of the powder collector 90, to perform air suction when the powder 20 is drawn up from the collection port 92.

Such a configuration reliably collects surplus powder.

However, if the powder 20 is too collected, the amount of the powder 20 supplied to the fabrication chamber 22 decreases. Accordingly, the air suction force is adjusted. For example, the powder collector 90 may mount a weight detector to detect the weight of collected powder. When the weight of collected powder is a predetermined weight or more, the air suction is stopped or the air suction force is reduced to prevent excessive collection of the powder supplied.

Figure 16A:
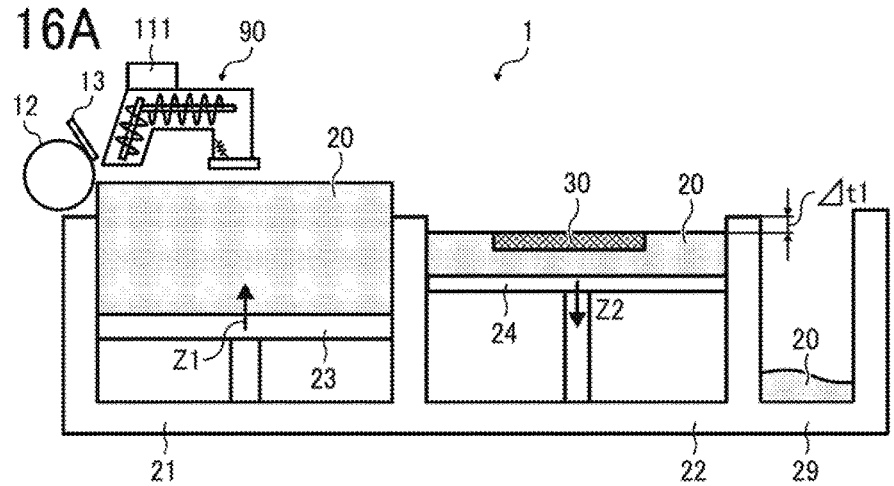
FIGS. 16A through 16E are illustrations of a flow of fabrication in the fifth embodiment.
Figure 16B:
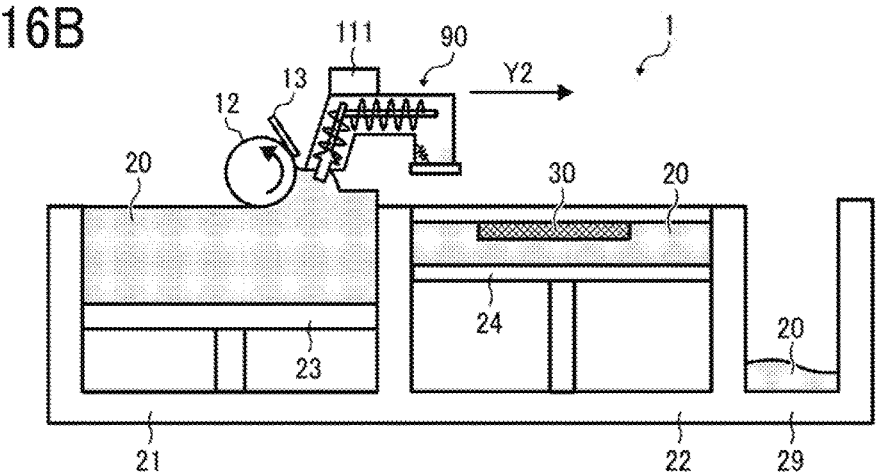
Figure 16C:
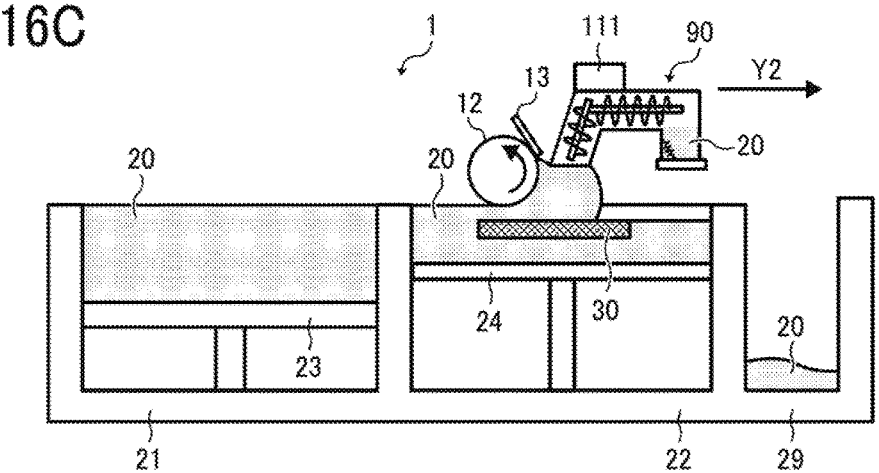
Figure 16D:
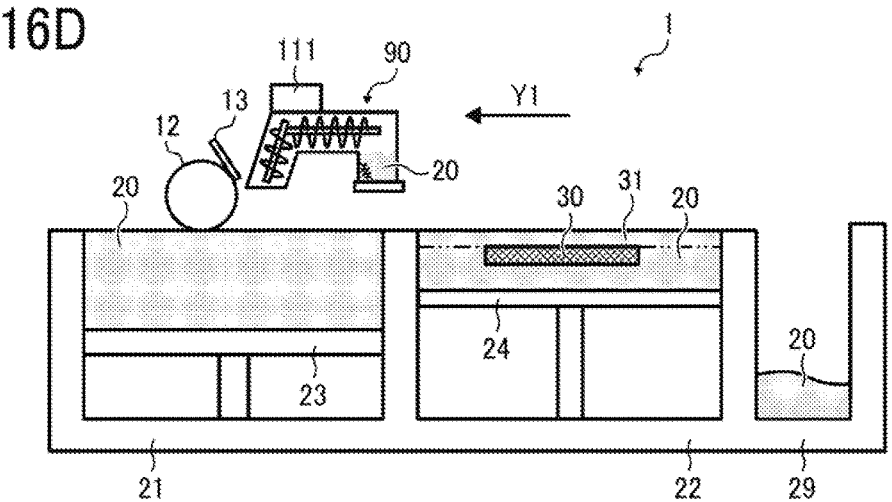
Figure 16E:
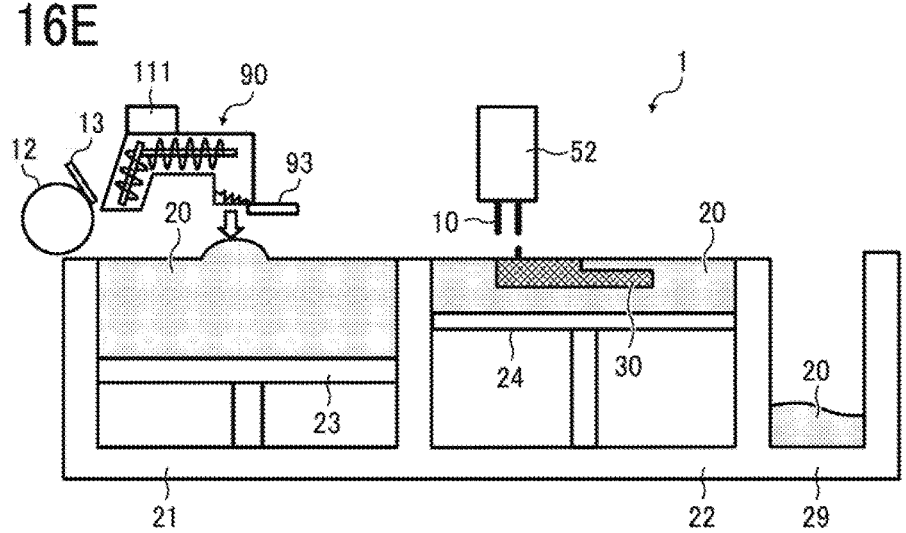

As illustrated in FIG. 16B, the air suction is performed only when the flattening roller 12 transfers and supplies the powder 20. As illustrated in FIGS. 16A, 16C, 16D, and 16E, the air suction is stopped otherwise.

Figure 17A:
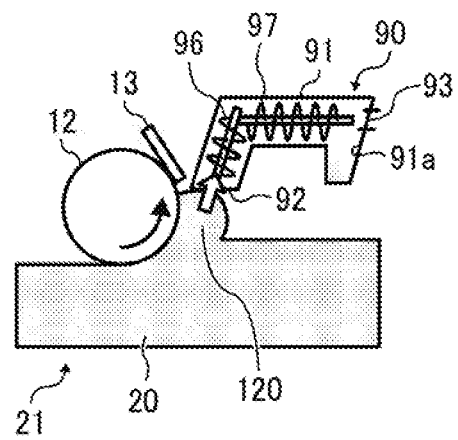
FIGS. 17A and 17B are illustrations of the supply chamber part in the sixth embodiment of the present disclosure.
Figure 17B:
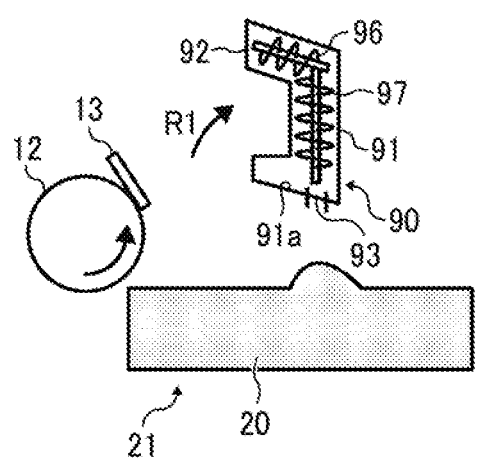

Next, a sixth embodiment of the present disclosure will be described with reference to FIGS. 17A and 17B. FIGS. 17A and 17B are illustrations of a supply chamber part in the sixth embodiment.

In this embodiment, the collection port 92 side of the body container 91 of the powder collector 90 is upwardly rotatable around the discharge port 93 side. The discharge port 93 is disposed at a position such that the discharge port 93 is open toward the supply chamber 21 when the body container 91 rotates.

For such a configuration, after the powder 20 is collected with the powder collector 90 as illustrated in FIG. 17A, the body container 91 of the powder collector 90 is rotated in a direction indicated by arrow R1. Accordingly, the discharge port 93 is open downward, thus causing the contained powder 20 to fall by its weight and be discharged.

As described above, in this embodiment, the collected powder 20 falls into the supply chamber 21 with rotation of the body container 91 of the powder collector 90. Such a configuration allows the discharge port 93 to have a hole shape without any lid, thus achieving a more simple configuration.

As a rotation mechanism of the body container 91 of the powder collector 90, for example, a rotation drive source may be disposed. In some embodiments, as described above, pins may be disposed at both lateral ends of the supply chamber 21 so that, at the initial (original) position of the flattening roller 12, the pins push and rotate the body container 91. Alternatively, in some embodiments, rails may be disposed at lateral sides so that the body container 91 rotate on the rails.

The body container 91 has an inclined face 91a obliquely inclined downward the discharge port 93, thus facilitating the powder 20 to naturally fall.

Figure 18:
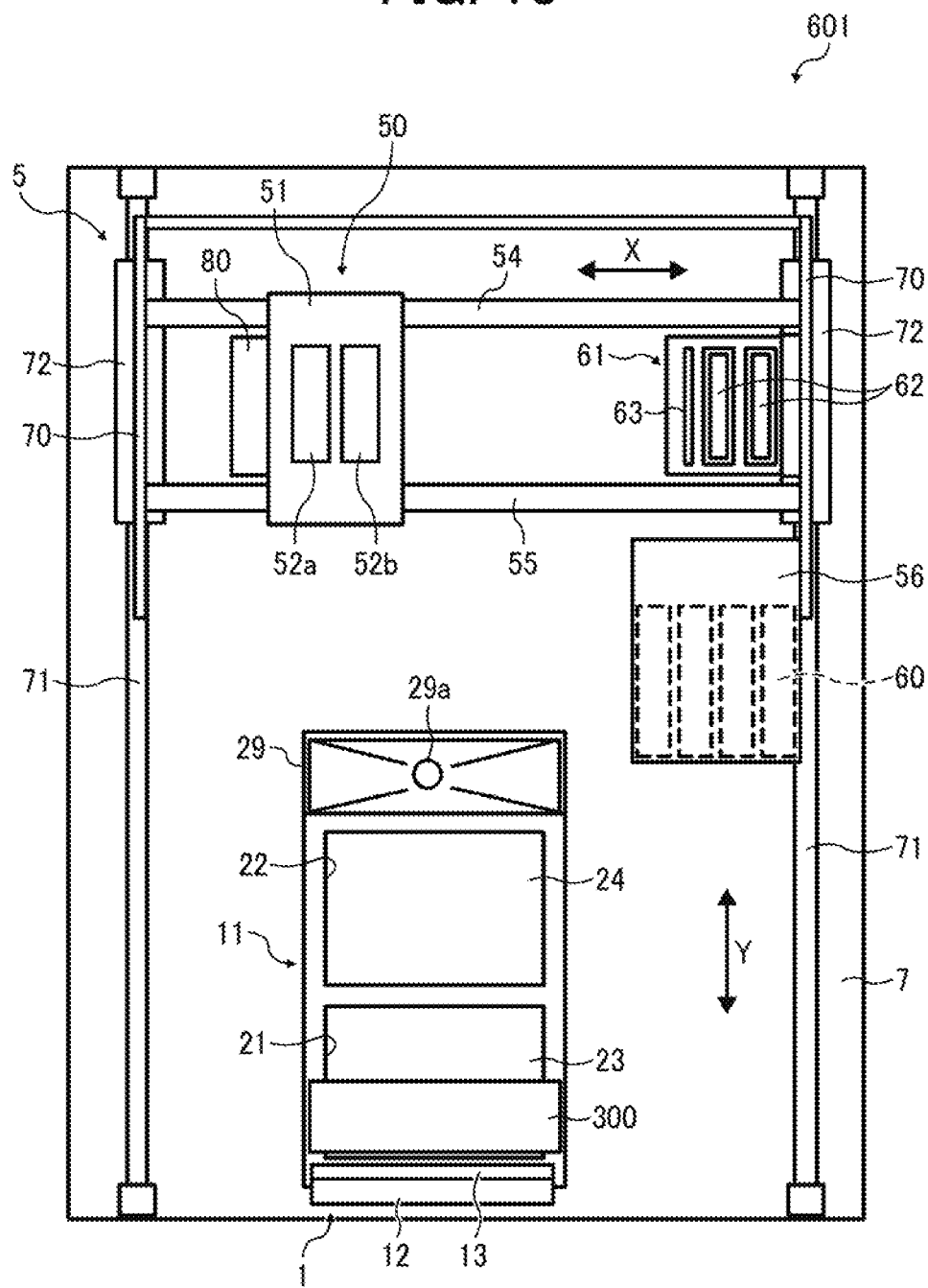
FIG. 18 is a plan view of the three-dimensional fabricating apparatus according to a seventh embodiment of this disclosure.
Figure 19:
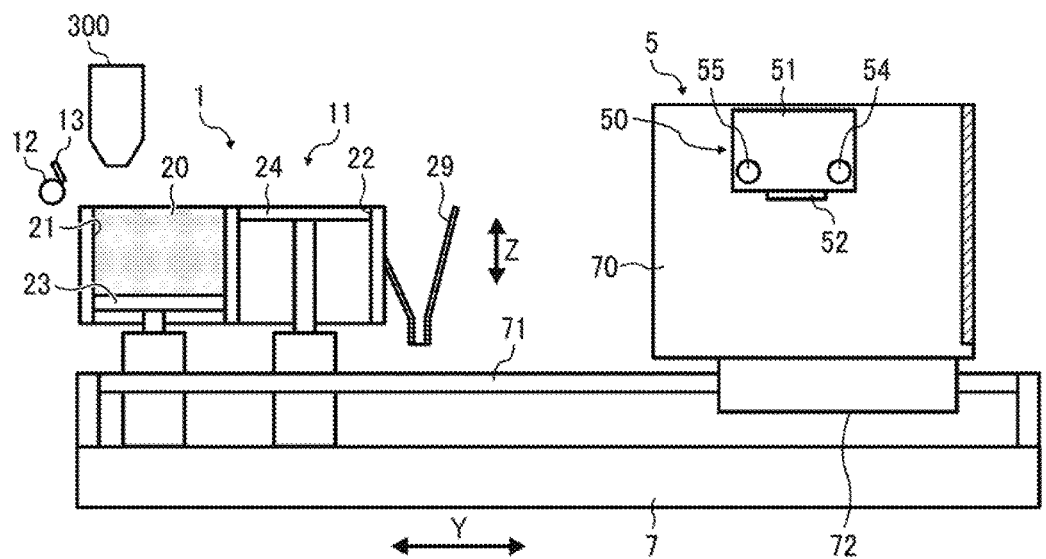
FIG. 19 is a side view of the three-dimensional fabricating apparatus of FIG. 18.
Figure 20:
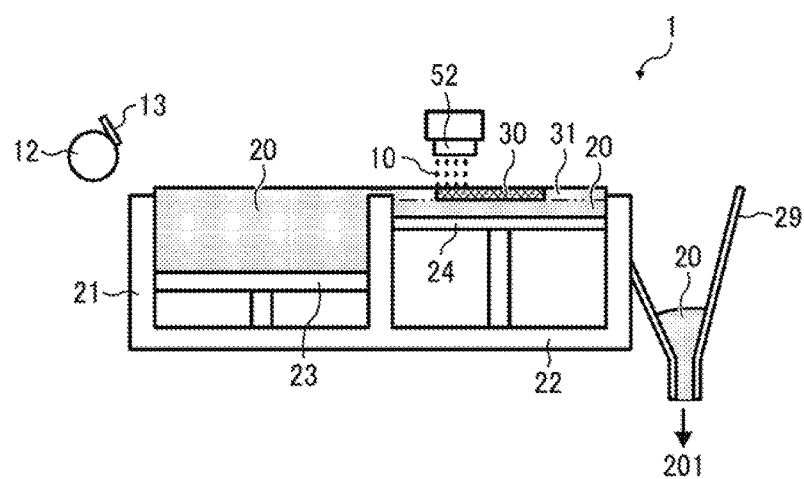
FIG. 20 is a cross-sectional view of a fabrication section of the three-dimensional fabricating apparatus of FIG. 18.

Next, a seventh embodiment of the present disclosure is described with reference to FIGS. 18 to 20. FIG. 18 is a plan view of the three-dimensional fabricating apparatus according to the seventh embodiment of this disclosure. FIG. 19 is a side view of the three-dimensional fabricating apparatus of FIG. 18. FIG. 20 is a cross-sectional view of a fabrication section of the three-dimensional fabricating apparatus of FIG. 18. In FIG. 20, a state of the fabricating section during fabrication is illustrated.

In this embodiment, a powder reservoir 300 is disposed as a reservoir to reserve the powder 20 to be supplied to the supply chamber 21. The powder reservoir 300 constitutes the powder supplier 554.

The surplus powder receiver 29 receives surplus powder discharged to the outside of the fabrication chamber 22 and has a discharge port 29a through which the powder 20 is discharged. The discharge port 29a has a funnel shape and is disposed at a bottom of the surplus powder receiver 29.

Figure 21:
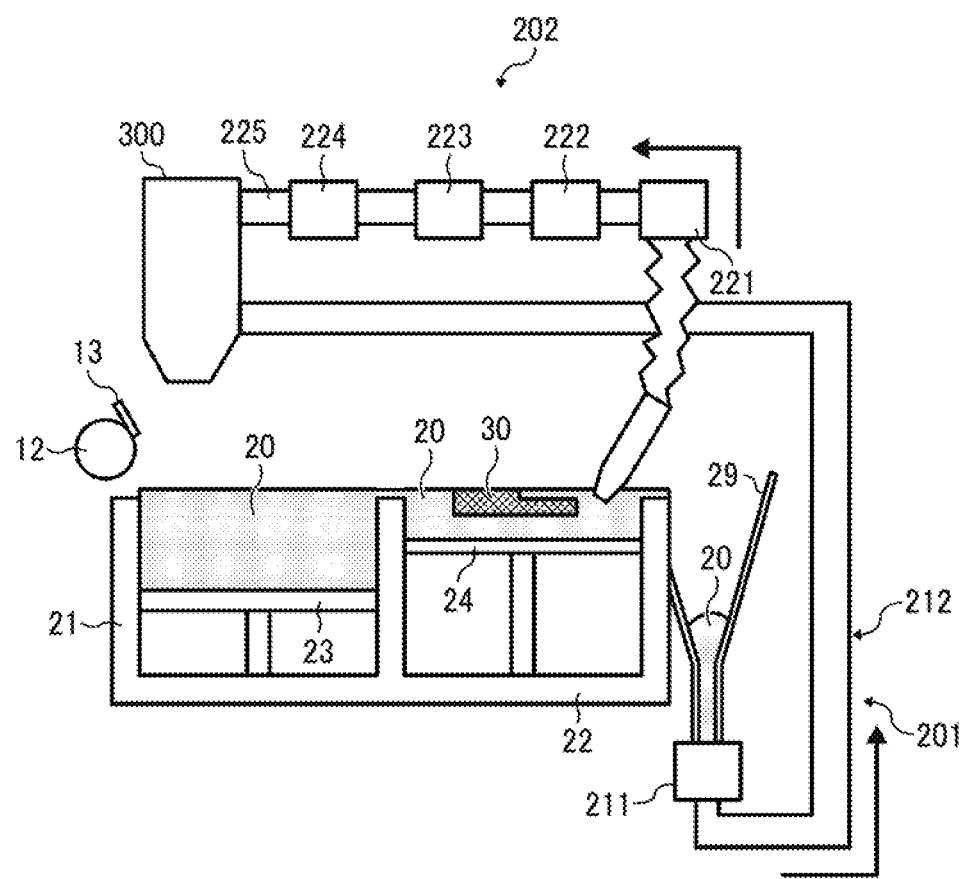
FIG. 21 is an illustration of a powder collection recycling device according to the seventh embodiment.

Next, a powder collection recycling device according to this embodiment of the present disclosure is described with reference to FIG. 21. FIG. 21 is an illustration of a powder collection recycling device according to this embodiment.

In this embodiment, the three-dimensional fabricating apparatus includes a first collection recycling device 201 and a second collection recycling device 202 as the powder collection recycling device. The first collection recycling device 201 collects the powder 20 discharged to the outside of the fabrication chamber 22 and performs processing to restore the collected powder 20 to a usable state. The second collection recycling device 202 collects the powder 20 in the fabrication chamber 22 and performs processing to restore the collected powder 20 to a usable state.

The first collection recycling device 201 includes a recycle processing unit 211 to perform processing to restore the powder 20, sent from the discharge port 29a of the surplus powder receiver 29, to a usable state. A transfer unit 212 transfers the powder, which has been restored to the usable state, to the powder reservoir 300.

The second collection recycling device 202 includes a suction collection unit 221 to suck and collect the powder 20 in the fabrication chamber 22 and recycle processing units 222, 223, and 224 to perform processing in turn to restore the collected powder 20 to a usable state. A transfer unit 225 transfers the powder, which have been restored in the usable state through the recycle processing units 222, 223, and 224, to the powder reservoir 300.

The processing performed by the recycle processing units 222, 223, and 224 of the second collection recycling device 202 at least partially differs from the processing performed by the recycle processing unit 211 of the first collection recycling device 201.

Figure 22:
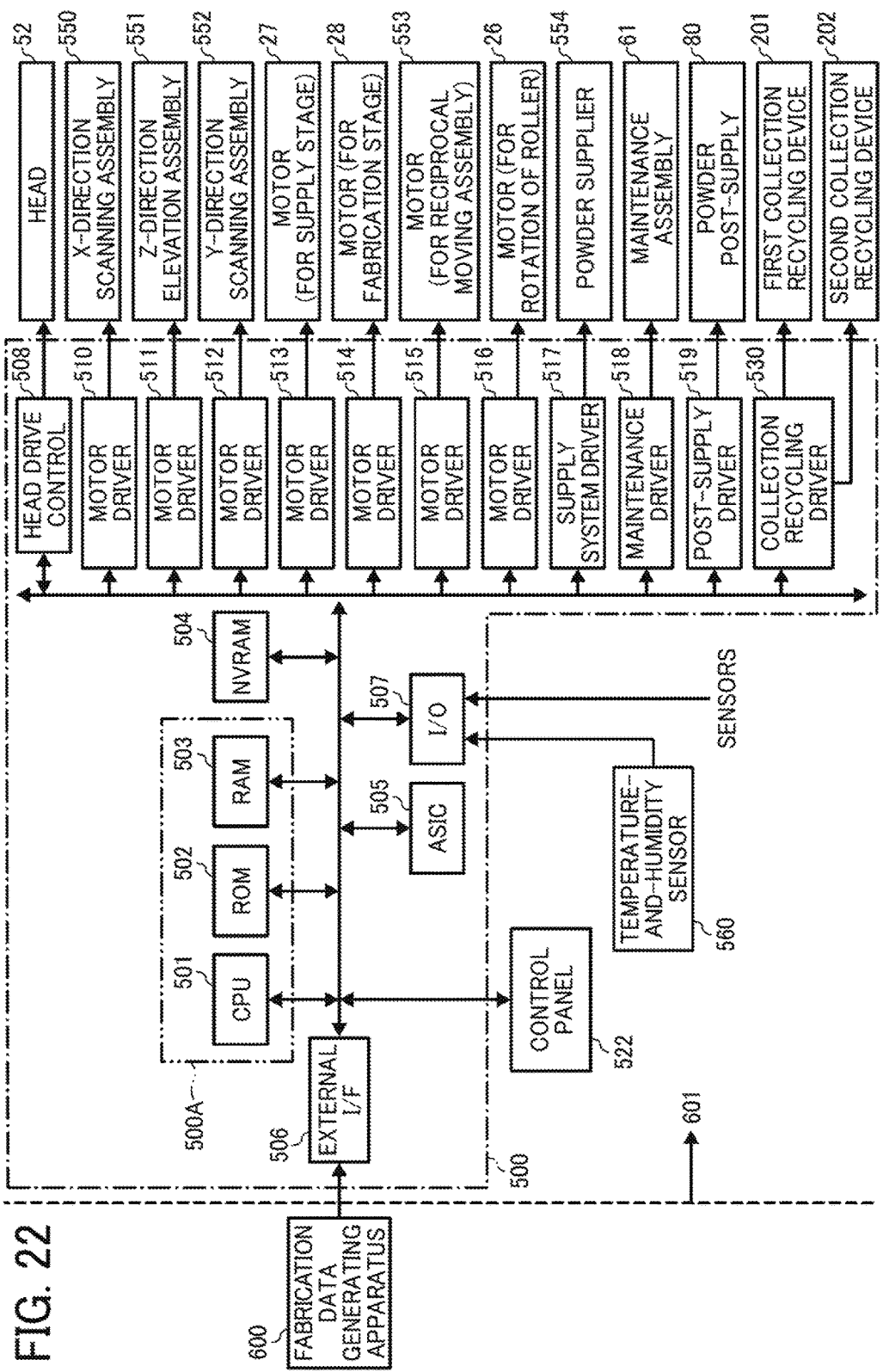
FIG. 22 is a block diagram of the controller according to the seventh embodiment.

Next, an example of the controller according to this embodiment is described with reference to FIG. 22. FIG. 22 is a block diagram of the controller according to this embodiment.

The controller 500 as the controller according to this embodiment includes a collection recycling driver 530 to drive each of the first collection recycling device 201 and the second collection recycling device 202.

Except for the configuration, components of the controller 500 are similar to, even if not the same as, those described in FIGS. 1 through 5. Therefore, redundant descriptions thereof are omitted below.

Next, a flow of fabrication in this embodiment is described with reference to FIGS. 23A through 23E. FIGS. 23A through 23E are illustrations of the fabrication section 1 in this embodiment.

Figure 23A:
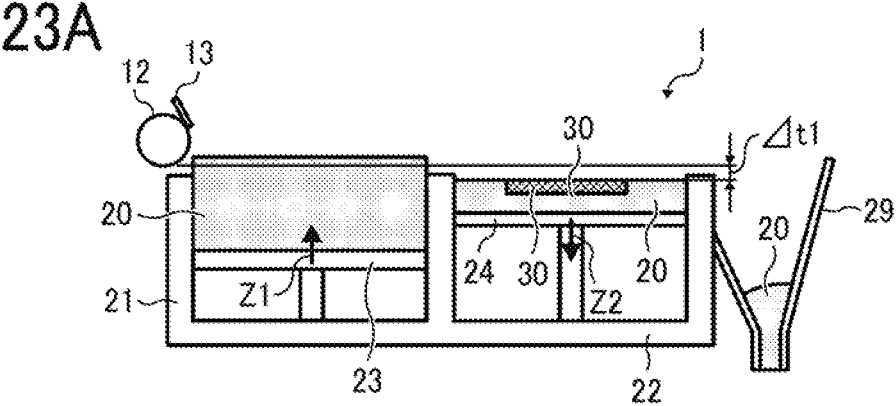
FIGS. 23A through 23E are illustrations of a flow of fabrication in the seventh embodiment.
Figure 23B:
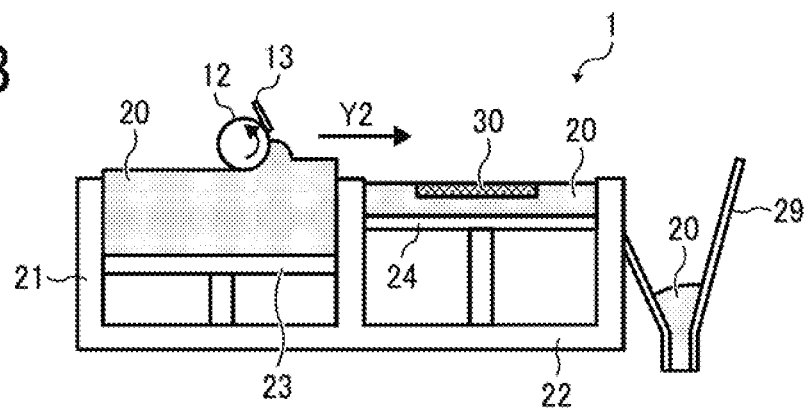
Figure 23C:
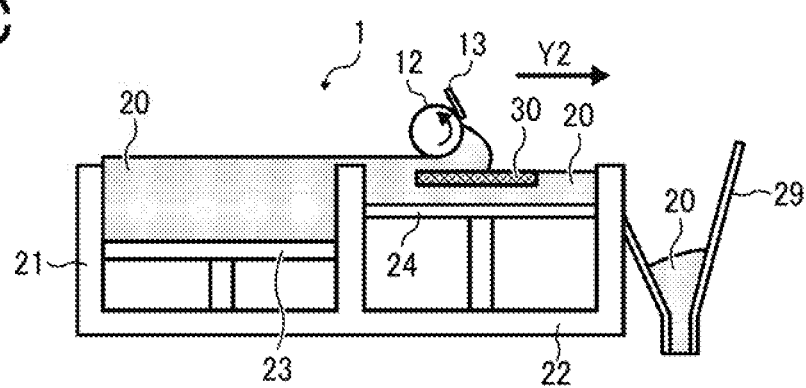
Figure 23D:
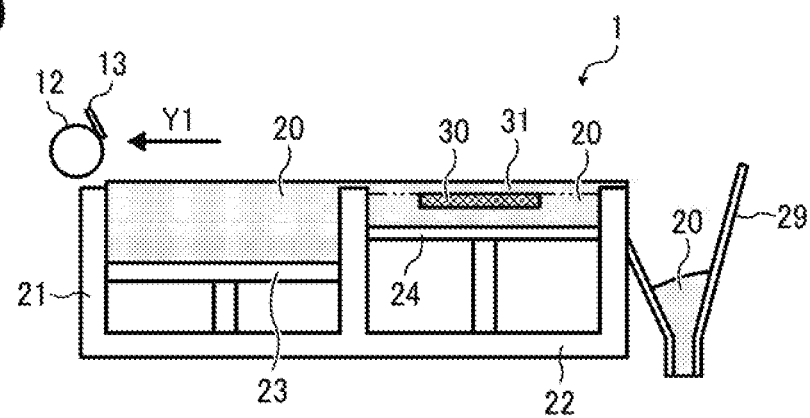
Figure 23E:
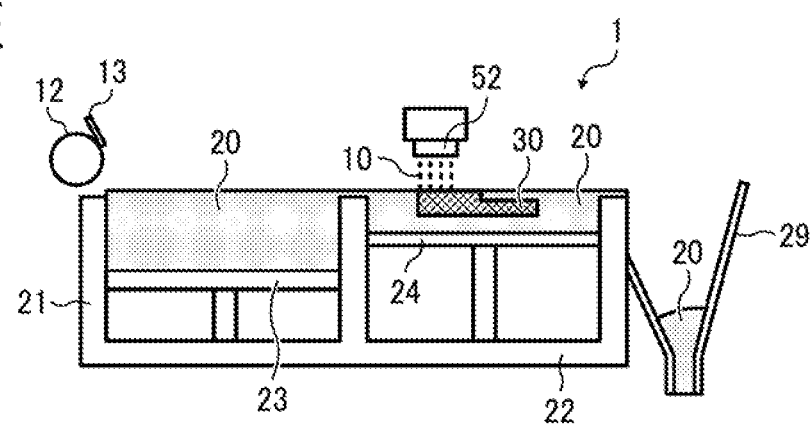

In this embodiment, likewise, when a second fabrication layer 30 is formed on the first fabrication layer 30, as illustrated in FIG. 23A, the supply stage 23 of the supply chamber 21 moves upward in a direction indicated by arrow Z1, and the fabrication stage 24 of the fabrication chamber 22 moves downward in a direction indicated by arrow Z2.

At this time, a downward movement distance of the fabrication stage 24 is set so that a distance between an upper face of a surface (powder surface) of the powder layer 31 of the fabrication chamber 22 and a lower portion (lower tangential portion) of the flattening roller 12 is Δt1.

In such a case, the flattening roller 12 is disposed at a distance from an upper end surface of each of the supply chamber 21 and the fabrication chamber 22. Accordingly, in this embodiment, when the powder 20 is transferred and supplied to the fabrication chamber 22 for flattening, the surface (powder surface) of the powder layer 31 is placed at a position higher than the upper end surface of each of the supply chamber 21 and the fabrication chamber 22.

Such a configuration reliably prevents the flattening roller 12 from contacting the upper end surface of each of the supply chamber 21 and the fabrication chamber 22, thus reducing the damage of the flattening roller 12. If the surface of the flattening roller 12 is damaged, streaks would occur in the surface of the powder layer 31, thus reducing flatness.

Other steps are similar to, even if not the same as, the steps of the flow described in FIG. 6, and therefore redundant descriptions thereof are omitted below.

Figure 24:
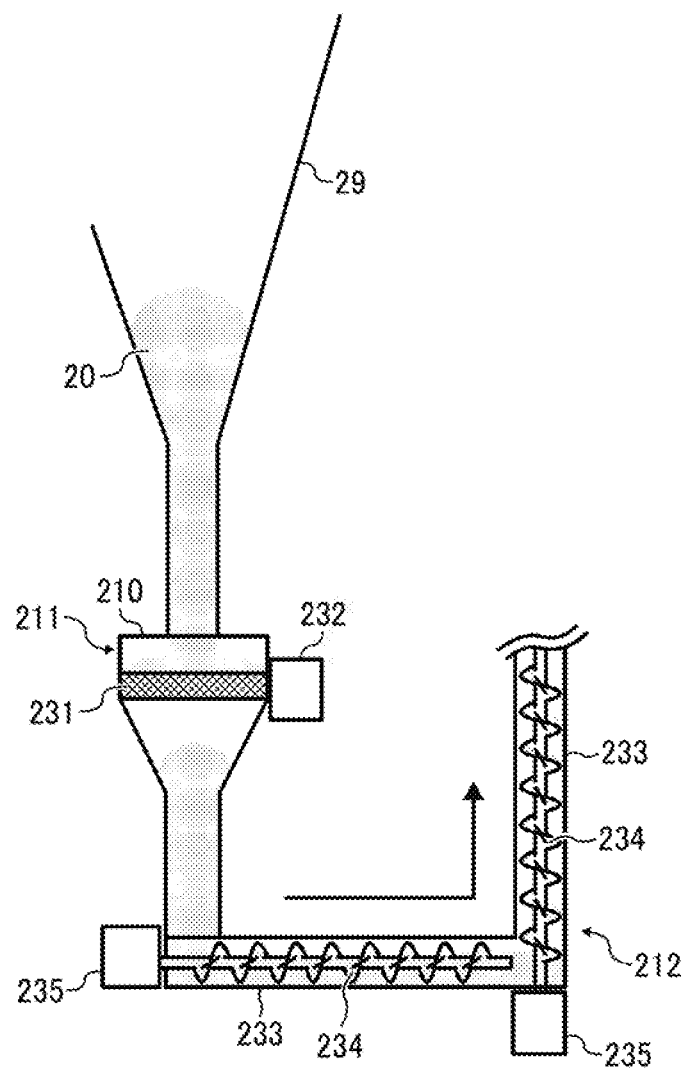
FIG. 24 is an illustration of a first collection recycling device in the seventh embodiment.

Next, the first collection recycling device 201 in this embodiment is described with reference to FIG. 24. FIG. 24 is an illustration of the first collection recycling device 201 in this embodiment.

The recycle processing unit 211 includes a filter 231 and a vibrator 232. The filter 231 filters the powder 20 into a vessel 210 to remove aggregated powder for classification. The vibrator 232 is disposed outside the vessel 210 to vibrate the entire vessel 210. By vibrating the entire vessel 210 with the vibrator 232, the recycle processing unit 211 classifies the powder 20 while crushing aggregated powder.

The transfer unit 212 includes a transfer passage 233, a plurality of screws 234, and a plurality of screw rotation motors 235. The transfer passage 233 transfers the powder 20, which having passed the recycle processing unit 211, to the powder reservoir 300. The plurality of screws 234 transfers the powder 20. The plurality of screw rotation motors 235 drives and rotates the plurality of screws 234.

Figure 25:
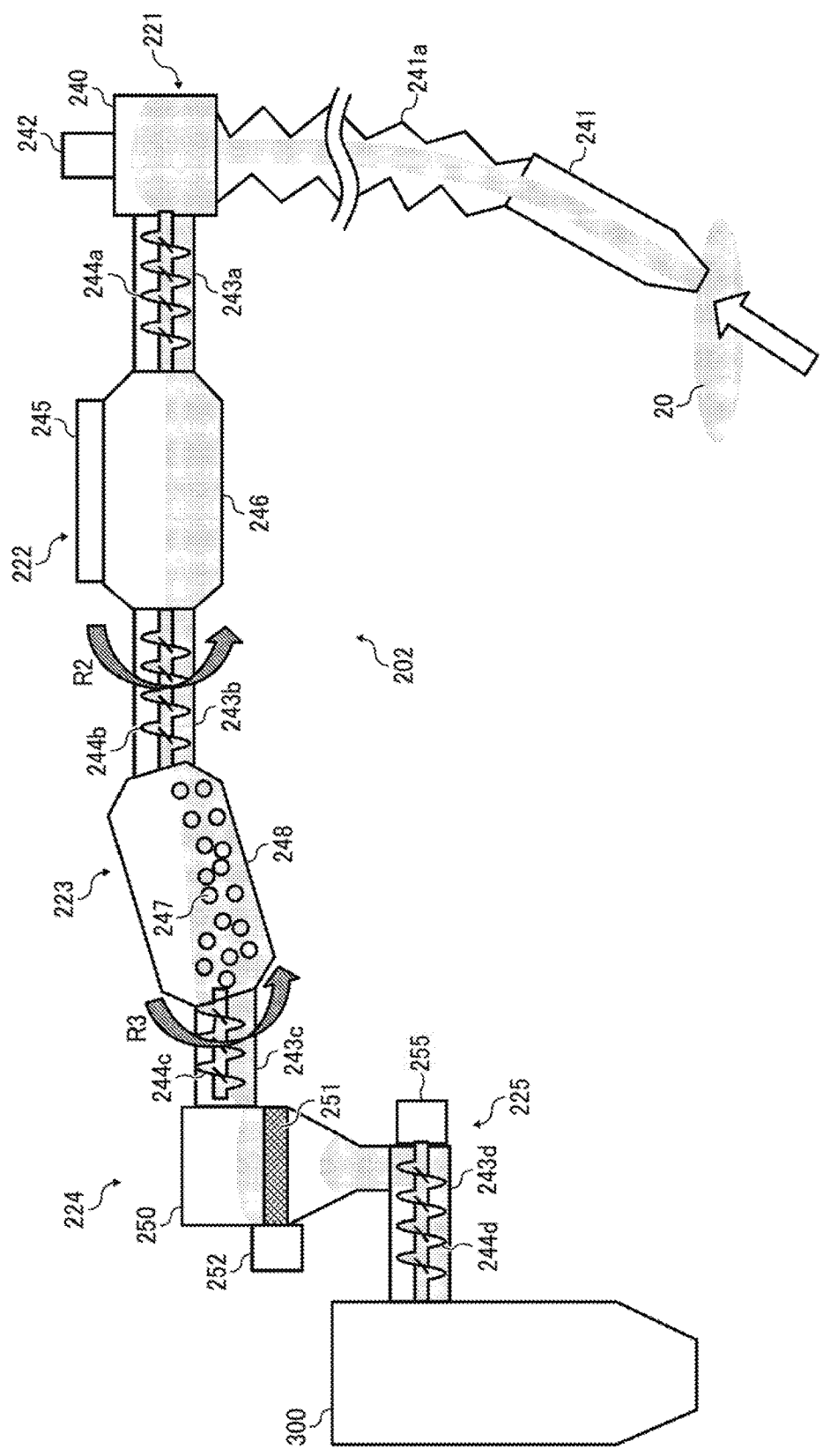
FIG. 25 is an illustration of a second collection recycling device in the seventh embodiment.

Next, the second collection recycling device in this embodiment is described with reference to FIG. 25. FIG. 25 is an illustration of the second collection recycling device 202 in this embodiment.

The suction collection unit 221 includes a movable suction port 241, a suction unit 242 to generate sucking pressure in the suction port 241, and a vessel 240 to contain the powder 20 collection by suction. A transport screw 244a transfers the powder 20, which has been sucked and collected by the suction collection unit 221, to the recycle processing unit 222 via a transport passage 243a.

The suction collection unit 221 includes, e.g., a tube 241a that is used in collecting unbound powder 20 in the fabrication chamber 22 after the end of fabrication and have a slightly extendable and contractable shape (e.g., accordion shape) in a portion other than a suction leading end of the suction port 241. The tube has such a length that the suction leading end of the suction port 241 sufficiently reaches inner corners of the fabrication chamber 22. The tube is secured to a position at which the tube does not interfere with the flattening roller 12 and the liquid discharge device 50 during fabrication. An ON/OFF switch of the suction unit 242 is disposed at, e.g., the control panel 522. After fabrication, a user turns on and off the suction unit 242 at desired timing.

The recycle processing unit 222 includes a drum-shaped vessel 246 with a heater 245, to dry and dehumidify the powder 20. A transport screw 244b transfers the powder 20, which have been dried and dehumidified with the recycle processing unit 222, to the recycle processing unit 223 via a transport passage 243b. Note that the vessel 246 rotates in a direction indicated by arrow R2 to uniformly dry and dehumidify the powder 20.

The recycle processing unit 223 includes a drum-shaped vessel 248 to contain beads 247 and rotate in a direction indicated by arrow R3, and crushes the powder 20. The transport screw 244c transfers the powder 20, which has been crushed by the recycle processing unit 223, to the recycle processing unit 224 via a transport passage 243c.

Similarly with the recycle processing unit 211 of the first collection recycling device 201, the recycle processing device 224 includes a filter 251 and a vibrator 252. The filter 231 filters the powder 20 into a vessel 250 to remove aggregated powder for classification. The vibrator 252 is disposed outside the vessel 250 to vibrate the entire vessel 250. By vibrating the entire vessel 250 with the vibrator 252, the recycle processing device 224 classifies the powder 20 while crushing aggregated powder.

Note that the filter 251 performs classification in a manner similar to, even if not the same as, the manner of the filter 231 of the first collection recycling device 201, thus allowing a similar degree of classification with the first collection recycling device 201 and the second collection recycling device 202.

A transport screw 244d of the transfer unit 225 transfers the powder 20, which has been classified with the recycle processing unit 224, to the powder reservoir 300 via a transport passage 243d. The transport screw 244d is driven and rotated by a screw rotation motor 255.

Next, the collection and recycling of the powder in the three-dimensional fabricating apparatus according to this embodiment are described below For surplus powder 20, which has not been used for the formation of the powder layer 31, of the powder 20 supplied to the fabrication chamber 22, the amount of adhesion of, e.g., fabrication liquid discharged from the head 52 is relatively low and the degree of aggregation is also relatively low. Accordingly, the powder is restored to a usable state with more simple processing.

The first collection recycling device 201 performs classification processing in the recycle processing unit 211, restores the powder 20 to a usable state, and transfers the powder 20 to the powder reservoir 300.

By contrast, for example, mist occurring with discharge of fabrication liquid is more likely to adhere to the powder 20 in the fabrication chamber 22. Accordingly, more aggregated powder is contained in the powder 20 in the fabrication chamber 22. Accordingly, the powder is unlikely to be restored to a usable state with simple processing.

Hence, for the second collection recycling device 202, the powder, which has been collected in the suction collection unit 221, is transferred to the recycle processing unit 222. The recycle processing unit 222 performs drying and dehumidifying processing to dry and dehumidify the collected powder. At this time, the second collection recycling device 202 heats the powder with the heater 245 while rotating the drum-shaped vessel 246, thus performing more efficient and uniform drying and dehumidification.

After drying and dehumidification, the powder is transferred to the recycle processing unit 223 and crushed in the recycle processing unit 223. In this crushing processing, aggregated powder is crushed using, e.g., the beads 247 in the rotatable drum-shaped vessel 248.

Examples of the materials of the beads 247 include stainless steel (SUS) and zirconia. The diameter of the beads 247 is, for example, from 100 μm to 1000 μm and preferably larger than the particle diameter of the powder 20.

The beads 247 may be made of dehumidifying material. Using dehumidifying beads allows more reliable dehumidification of the powder, thus obtaining more stable powder properties.

The drum-shaped vessel 246 is disposed in a tilted state. Such a tilted state facilitates transport of the powder from the upstream side to the downstream side. In such a case, a filter is disposed at an outlet of the crushing step to prevent the beads 247 from moving into the next step.

After crushing processing, the powder is transferred to the recycle processing unit 224, classified in the recycle processing unit 224, and transferred to the powder reservoir 300.

In other words, as described above, for the unbound powder 20 in the fabrication chamber 22, mist of fabrication liquid is likely to adhere to the unbound powder 20 during fabrication. Accordingly, more aggregated powder is contained in the powder 20 in the fabrication chamber 22. Hence, in recycle, a plurality of steps is provided to remove aggregated powder and obtain powder properties (e.g., granularity profile and flowability) equivalent to those of the powder 20 before fabrication. Accordingly, mist of fabrication liquid is dried and dehumidified and aggregated powder is crushed and removed (classified), thus obtaining stable powder properties.

In this embodiment, processing is performed to collect and recycle unbound powder 20 inside and outside the fabrication chamber 22, which have different aggregation states of powder and different amount of aggregated powder, in separate passages (routes). Such a configuration reliably removes aggregated powder and obtains reliable powder properties.

Powder outside the fabrication chamber 22, which can restore (recycle) the powder to a usable state with more simple processing, is quickly transported to the powder reservoir 300X), thus enhancing the efficiency of recycle and reducing the recycling time. In addition, the waiting time for the next fabrication can be shortened.

Figure 26:
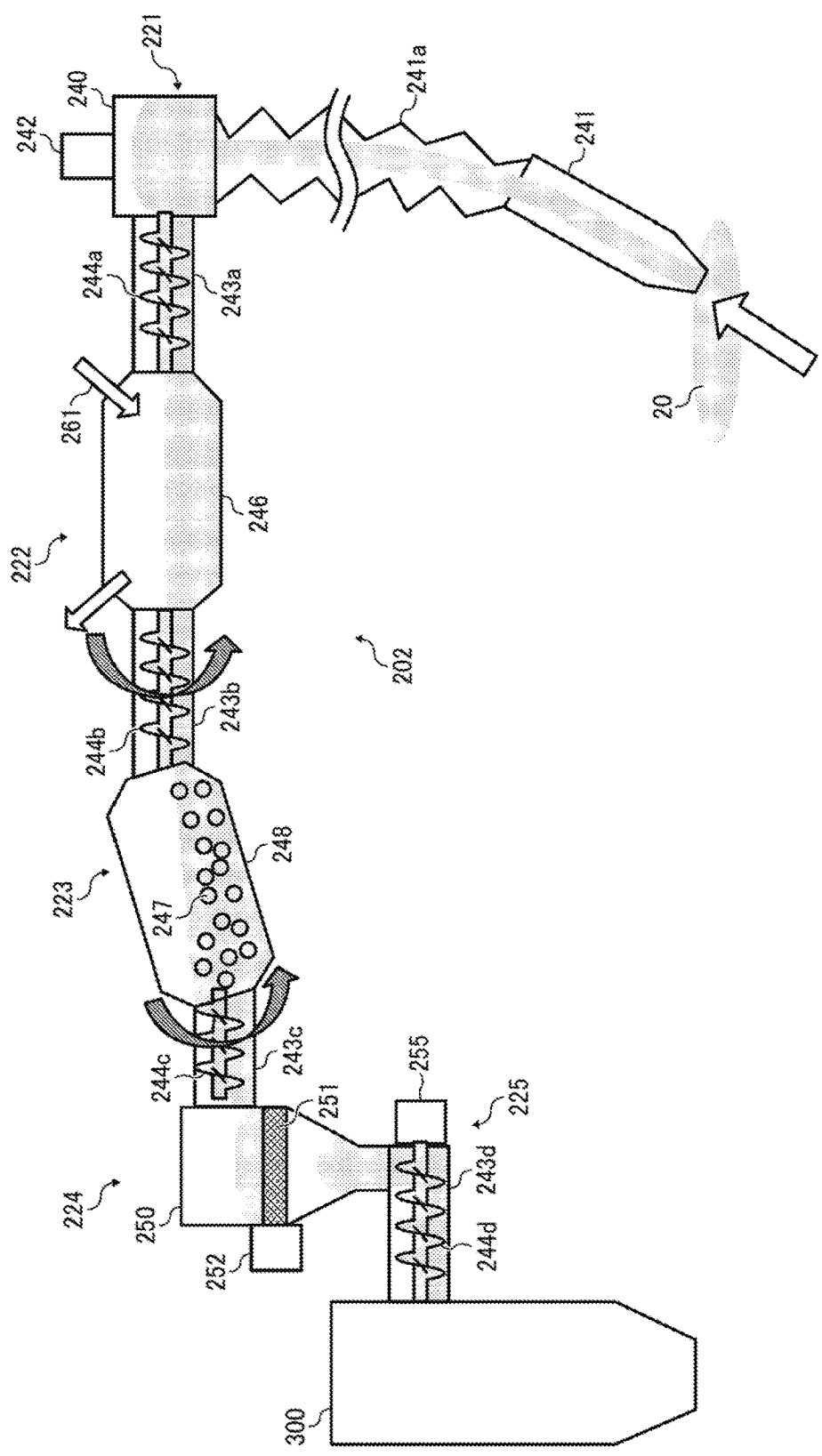
FIG. 26 is an illustration of the second collection recycling device in an eighth embodiment of the present disclosure.

Next, an eighth embodiment of the present disclosure is described with reference to FIG. 26. FIG. 26 is an illustration of the second collection recycling device 202 in this embodiment.

The recycle processing unit 222 blows a wind (airflow) 261 into the drum-shaped vessel 246 in rotation, to dry and dehumidify powder 20. In such a case, using a hot wind as the wind 261 allows more efficient drying and dehumidification, thus reducing the recycling time.

Figure 27:
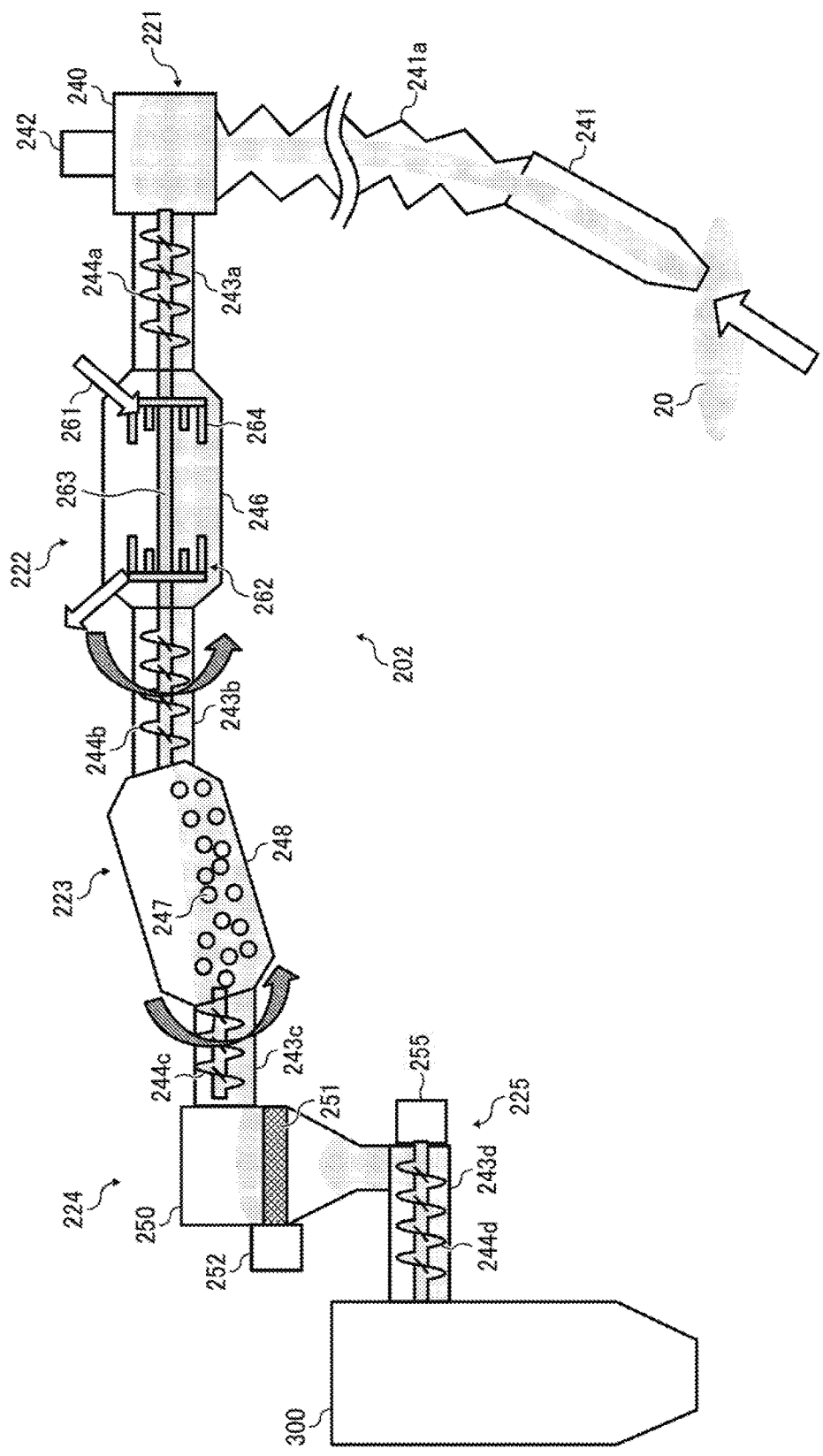
FIG. 27 is an illustration of the second collection recycling device in a ninth embodiment of the present disclosure.

Next, a ninth embodiment of the present disclosure is described with reference to FIG. 27. FIG. 27 is an illustration of the second collection recycling device 202 in this embodiment.

The recycle processing unit 222 includes a stirring unit 262 to stir the powder 20 in the drum-shaped vessel 246, into which an airflow is blown. The stirring unit 262 includes stirrers 264 mounted on a rotation shaft 263 rotatable with a transport screw 244b. In some embodiments, the stirrers 264 may be driven by another drive source differing from a driving source for the transport screw 244b.

Using the stirring unit 262 allows stirring of the powder and reduction of the drying and dehumidification time with airflow.

Figure 28:
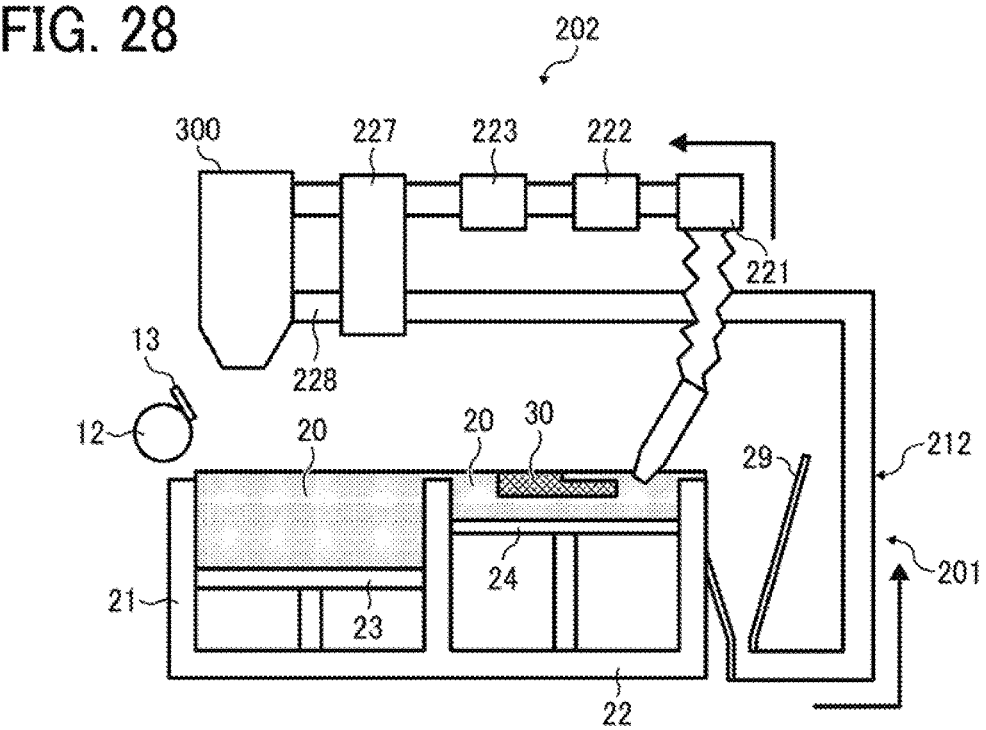
FIG. 28 is an illustration of the first collection recycling device and the second collection recycling device in the ninth embodiment.

Next, a tenth embodiment of the present disclosure is described with reference to FIG. 28. FIG. 28 is an illustration of the first collection recycling device 201 and the second collection recycling device 202 in this embodiment.

In this embodiment, a common recycle processing unit 227 performs common classification processing of the first collection recycling device 201 and the second collection recycling device 202.

Such a configuration allows a reduction of the number of components and downsizing of the apparatus.

Figure 29:
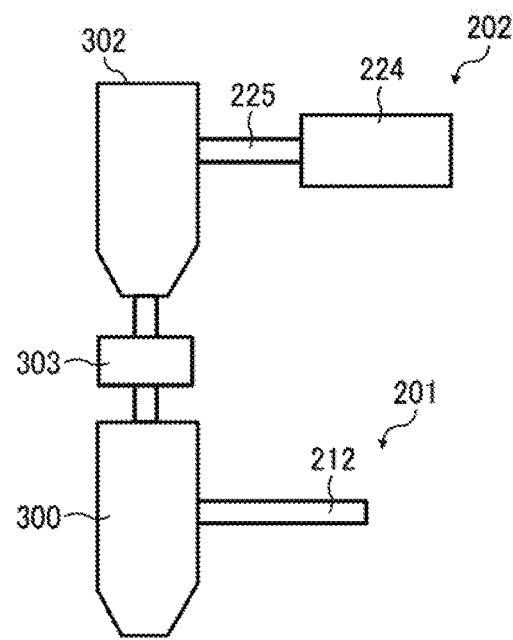
FIG. 29 is an illustration of a powder storage part in an eleventh embodiment of the present disclosure.

Next, an eleventh embodiment of the present disclosure is described with reference to FIG. 29. FIG. 29 is an illustration of a powder storage part in this embodiment.

In this embodiment, powder, which have been restored to a usable state in the first collection recycling device 201, is transferred to the powder reservoir 300. By contrast, powder, which have been restored to a usable state in the second collection recycling device 202, is transferred to an intermediate powder reservoir 302. The powder is transferred from the intermediate powder reservoir 302 to the powder reservoir 300 via a supply adjuster 303.

Such a configuration allows adjustment of the amount and rate of usage of the powder having been restored to the usable state in the second collection recycling device 202.

Figure 30:
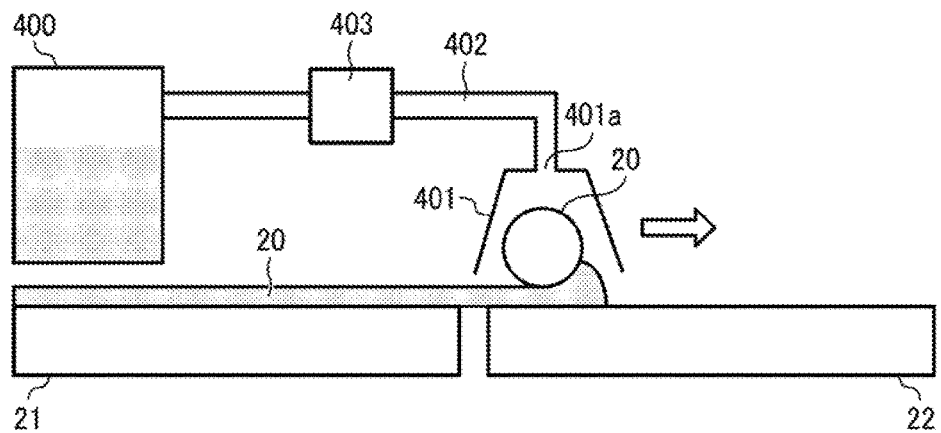
FIG. 30 is an illustration of a twelfth embodiment of the present disclosure.
Figure 31:
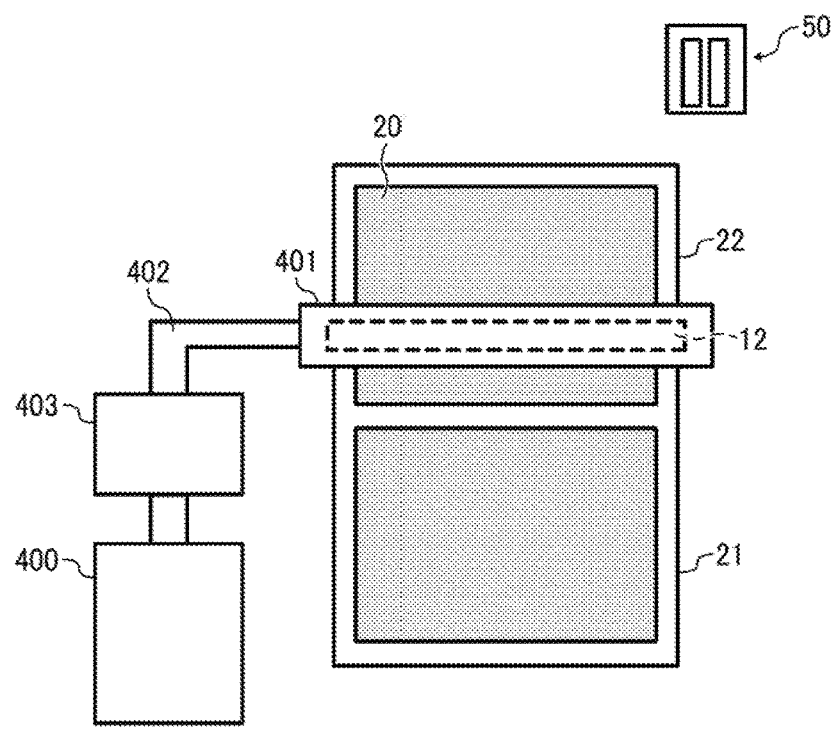
FIG. 31 is a plan view of a state in which a flattening unit is disposed on a fabrication chamber in the twelfth embodiment.
Figure 32:
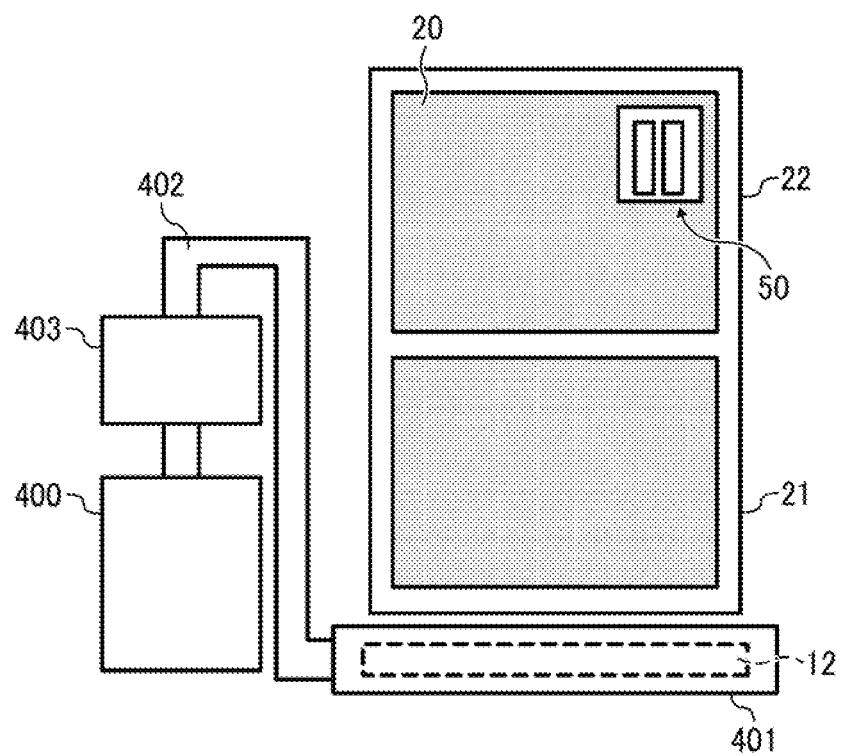
FIG. 32 is a plan view of a state in which the flattening unit is disposed at an initial position in the twelfth embodiment.

Next, a twelfth embodiment of the present disclosure is described with reference to FIGS. 30 to 32. FIG. 30 is an illustration of the twelfth embodiment. FIG. 31 is a plan view of a state in which the flattening unit is disposed on the fabrication chamber. FIG. 32 is a plan view of a state in which the flattening unit is disposed at the initial position.

In this embodiment, a cover 401 is disposed above the flattening roller 12 as the flattening unit and opposite a portion of an outer periphery of the flattening roller 12. The cover 401 moves with the flattening roller 12.

In this embodiment, the cover 401 has a suction port 401a to cover an entire upper portion other than a contact portion of the flattening roller 12, at which the flattening roller 12 contacts the powder 20, and suck the powder 20 in the cover 401. A portion of the powder 20 floating up in the cover 401 is sucked through the suction port 401a. In this embodiment, the cover 401 is disposed above the flattening roller 12. However, in some embodiments, the cover 401 may be disposed at a position opposite the flattening roller 12 from a lateral direction.

The cover 401 is connected to a powder reservoir 400 via a suction passage 402. A suction unit 403 to suck the inside of the cover 401 is disposed at the suction passage 402.

With such a configuration, as described above, the flattening miler 12 is moved from the initial position illustrated in FIG. 32, and the powder 20 is transferred and supplied to the fabrication chamber 22 and the powder layer 31 is formed.

At this time, the suction unit 403 is driven to generate a suction pressure in the cover 401. Accordingly, when flattening is performed with the flattening roller 12, the powder 20 floating up around the flattening roller 12 is sucked and collected into the powder reservoir 400.

In such a case, the rotation speed and movement speed of the flattening roller 12 are set to suitable conditions in accordance with the type and ambient conditions of the powder 20. Scattering of the powder 20 varies depending on, e.g., the type or particle diameter of the powder 20. Scattering of the powder 20 may also be affected by, e.g., the ambient temperature and humidity.

Therefore, the amount of suction from the suction port may be adjusted in accordance with the type or particle diameter of the powder 20 to be used or ambient conditions, such as temperature and humidity. For example, as a greater amount of the powder 20 floats up, the amount of suction is set to be greater.

Such a configuration reduces scattering of the powder in the apparatus, thus preventing scattered powder from adhering to the nozzle face of the head 52 and causing, e.g., discharge failure (jetting deviation or non-discharge) of the fabrication liquid 10. Such a configuration also reduces, e.g., soiling in the apparatus.

Figure 33:
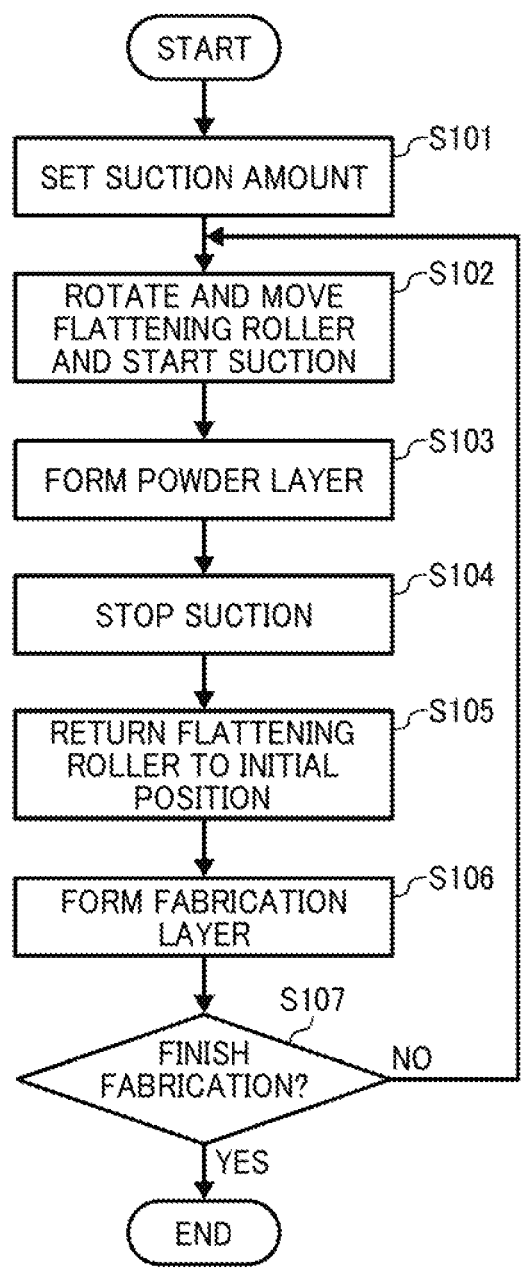
FIG. 33 is a flowchart of an example of control of fabrication operation in the twelfth embodiment.

Next, an example of control of fabrication operation in this embodiment is described with reference to FIG. 33.

At S101, the controller 500 sets the suction amount from the suction port 401a of the cover 401 of the flattening roller 12 in accordance with, e.g., the type of the powder 20 to be used and ambient conditions. In addition, for example, the rotation speed and movement speed of the flattening roller 12 is set in advance to perform suitable recoat processing (flattening processing).

At S102, the controller 500 starts rotation and movement of the flattening roller 12 and starts suction of the inside of the cover 401 with the suction unit 403. At S103, the controller 500 controls the flattening roller 12 to transfer and supply the powder 20 from the supply chamber 21 to the fabrication chamber 22 to form the powder layer 31 in the fabrication chamber 22.

At S104, the controller 500 stops the suction unit 403 when the formation of the powder layer 31 in the fabrication chamber 22 is completed. At S105, the controller 500 returns the flattening roller 12 to the initial position.

At S106, the controller 500 moves the head 52 to perform fabrication operation in accordance with three-dimensional slice data, to form a fabrication layer. When the fabrication is not finished (NO at S107), the controller 500 repeats a series of operations until the fabrication is completed (YES at S107), thus forming a fabrication object.

Such a flow collects and recycles the powder while reducing the floating-up of the powder, thus enhancing the use efficiency of the powder.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A three-dimensional fabrication apparatus comprising:
   a fabrication chamber in which powder is layered to form a powder layer, the powder of the powder layer is bonded together to form a layered fabrication object, and another layered fabrication object is laminated on the layered fabrication object;
   a supply chamber to retain the powder to be supplied to the fabrication chamber;
   a flattening unit to flatten the powder while transferring and supplying the powder from the supply chamber to the fabrication chamber in a transfer direction and generating a powder heap downstream in the transfer direction from the flattened powder; and
   a powder collector disposed downstream in the transfer direction from the flattening unit,
   the powder collector movable with movement of the flattening unit and arranged to collect a portion of the powder from the powder heap generated by the flattening unit downstream in the transfer direction from the flattened powder,
   the powder collector including:
     a body container to contain the powder inside;
     a collection port disposed in contact with the powder heap to introduce the powder collected from the heap to the body container; and
     a discharge port to discharge the powder contained in the body container,
   wherein, when the flattening unit transfers and supplies the powder, the powder collector collects the portion of the powder from the collection port and contains the portion of the powder in the body container,
   wherein, when the flattening unit returns to the supply chamber, the powder collector discharges and supplies the powder from the body container to the supply chamber through the discharge port, and wherein the powder collector further comprises plural transfer screws disposed in the body container and arranged one after another in a direction perpendicular to the transfer direction, to transfer the collected powder from the collection port to the discharge port.

2. The three-dimensional fabrication apparatus according to claim 1, further comprising a vibration applicator to vibrate the powder transferred and supplied by the flattening unit.

3. The three-dimensional fabrication apparatus according to claim 2, wherein the powder collector and the vibration applicator are integrally molded as a single unit.

4. The three-dimensional fabrication apparatus according to claim 1, further comprising an air suction device to suck air from the collection port.

5. The three-dimensional fabrication apparatus according to claim 1, wherein the collection port of the powder collector is disposed proximal to the flattening unit, and the discharge port of the powder collector is disposed distal to the flattening unit.

6. The three-dimensional fabrication apparatus according to claim 1, further comprising:
a powder removal member disposed to move along with the flattening unit,
wherein the flattening unit includes a flattening roller configured to rotate about a rotational shaft of the flattening roller, and
wherein the powder removal member is disposed in contact with a circumferential surface of the flattening roller, and remove powder attached to the flattening roller as the roller rotates about the rotational shaft of the flattening roller.

7. A three-dimensional fabrication apparatus comprising:
a fabrication chamber in which powder is layered to form a powder layer, the powder of the powder layer is bonded together to form a layered fabrication object, and another layered fabrication object is laminated on the layered fabrication object;
a supply chamber to retain the powder to be supplied to the fabrication chamber;
a flattening unit to flatten the powder while transferring and supplying the powder from the supply chamber to the fabrication chamber in a transfer direction and generating a powder heap downstream in the transfer direction from the flattened powder; and
a powder collector disposed downstream in the transfer direction from the flattening unit,
the powder collector movable with movement of the flattening unit and arranged to collect a portion of the powder from the powder heap generated by the flattening unit downstream in the transfer direction from the flattened powder,
the powder collector including:
a body container to contain the powder inside;
a collection port disposed in contact with the powder heap to introduce the powder collected from the heap to the body container; and
a discharge port to discharge the powder contained in the body container,
wherein the powder collector further comprises plural transfer screws disposed in the body container and arranged one after another in a direction perpendicular to the transfer direction, to transfer the collected powder from the collection port to the discharge port.

* * * * *